United States Patent [19]

Karp et al.

[11] 4,398,253
[45] Aug. 9, 1983

[54] SCALE CONTROLLER

[75] Inventors: Edward C. Karp, Belvidere, Ill.; Randy J. Curran, Las Vegas, Nev.

[73] Assignee: Sanitary Scale Company, Belvidere, Ill.

[21] Appl. No.: 260,091

[22] Filed: May 4, 1981

[51] Int. Cl.³ .............................................. G06K 15/02
[52] U.S. Cl. .................................... 364/466; 235/383; 177/4; 177/25
[58] Field of Search ................ 364/466, 900 MS File, 364/200 MS File; 177/2, 4, 25; 53/502; 235/61.9 R, 383

[56] References Cited

U.S. PATENT DOCUMENTS

| | | | |
|---|---|---|---|
| 3,688,276 | 8/1972 | Quinn | 364/200 |
| 3,974,496 | 8/1976 | Aptroot-Soloway | 364/518 |
| 4,109,857 | 8/1978 | Teroka et al. | 177/25 X |
| 4,229,794 | 10/1980 | Foster | 364/466 |
| 4,363,693 | 12/1982 | Fujii et al. | 364/466 X |
| 4,365,148 | 12/1982 | Whitney | 177/4 X |

Primary Examiner—Edward J. Wise
Attorney, Agent, or Firm—Cook, Wetzel, & Egan

[57] ABSTRACT

A controller is described which interfaces with a scale and a label printer for computing prices of weighed commodities, for displaying a human readable description of the commodity being weighed and other characteristics of the commodity, and for activating the label printer to print the displayed information on a label. The controller includes a keyboard for selecting and changing the information to be displayed and printed, and a cathode ray tube for displaying the information.

14 Claims, 13 Drawing Figures

SCALE CONTROLLER

BACKGROUND OF THE INVENTION

This invention is directed to an improved controller of the type which interfaces with a scale and a label printer so that the weight and price of commodities weighed on the scale, and other identifying indicia, are printed on a label which is subsequently applied to the commodity.

Controllers of the type referred to above typically include a keyboard for entering an index number which identifies a commodity to be weighed. In response to a keyboard entry, LEDs (light emitting diodes) are energized to indicate the entered index number, the price per pound of the commodity, and possibly other commodity characteristics which are stored in the controller's memory. Usually, only a numerical, as opposed to an alpha, read out is provided by the controller to indicate the type of commodity to be weighed. If any error is made during keyboard entry, the operator may not be aware of it because the controller only displays numbers which the operator may not recognize as identifying a commodity other than the commodity to be weighed.

To select the proper commodity index number for keyboard entry, a look-up table is usually provided. The operator refers to the look-up table to find "roast beef," for example, and its accompanying index number. However, should be data in the look-up table be inaccurate, (due to data changes previously made but not recorded), the information entered into and displayed by the controller will be inaccurate. Because the operator is given only a numerical read out by the controller, he may not be aware that the index number displayed by the controller does not correspond to the commodity to be weighed. In addition, there is always the possibility of human error in reading or manually (digitally) entering an index number (address).

These and other such human interface problems render conventional controllers somewhat difficult and time consuming to use and result in errors being made which may go undetected.

Accordingly, it is a general object of the invention to provide an improved controller for interfacing with a scale and a label printer.

It is a more specific object of the invention to provide such a controller which displays data in a format which is easier to read, relatively easy to modify, which does not require the use of an external lookup table and which provides convenient and positive means for the selection of items from an internal index.

BRIEF DESCRIPTION OF THE FIGURES

The objects stated above and other objects of the invention are set forth more particularly in the following detailed description of the accompanying drawings in which.

DESCRIPTION OF THE PREFERRED EMBODIMENT

Figure 1:
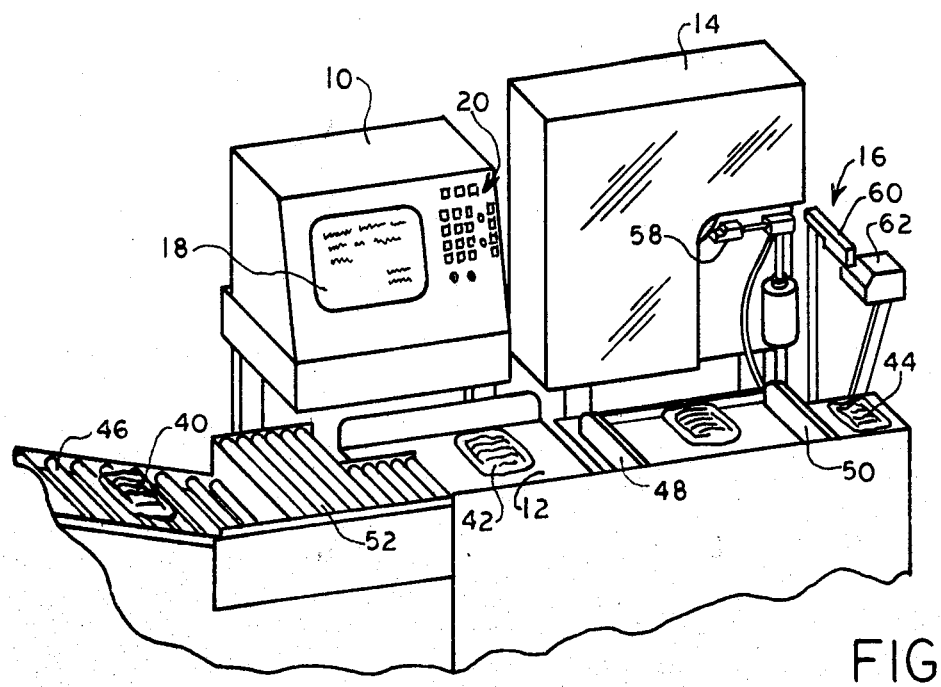
FIG. 1 illustrates a scale controller according to the invention in combination with a scale and a label printer, and the manner in which commodities may be fed to the scale.

Referring to FIG. 1, a controller 10 embodying the invention is shown in combination with a scale 12, a label printer 14 and apparatus designated generally at 16 for applying a printed label to a packaged commodity which has been weighed. This illustrated arrangement is particularly useful for the rapid weighing and label application of a large number of commodities as is frequently required in a supermarket, for example.

Figure 2:
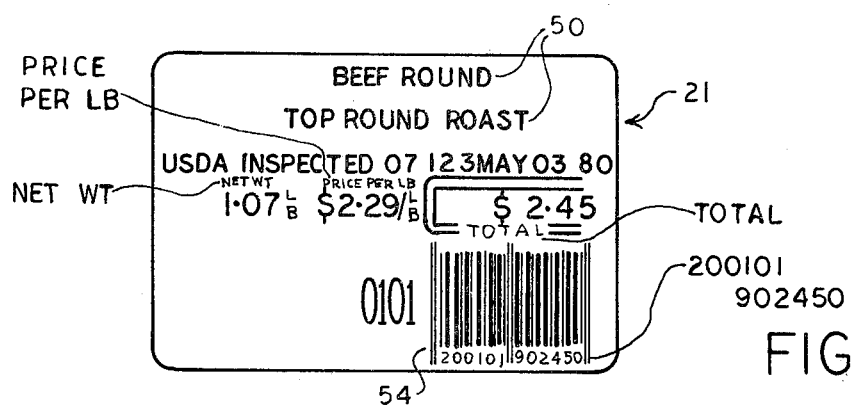
FIG. 2 illustrates a type of label printed by the label printer in response to actuation by the controller.

As described in more detail below, the controller 10 includes a memory which may be pre-programmed with a list of commodities, an alpha description of each commodity on the list, the price per pound of each commodity to be weighed and priced, tare weight, and various other characteristics of the commodities to be processed. All this pre-programmed information may be displayed on the screen of a CRT (cathode ray tube) 18 by operator actuation of selected keys on a keyboard 20. By manipulation of the keyboard 20 as described below, an operator can cause the CRT 18 to display the alpha description of the commodities which are to be weighed to insure that the controller 10 is conditioned to compute the price of the exact commodity which is to be weighed and priced. Corrections or modifications may be made to the displayed alpha description of the commodity, data not pre-programmed may be added, and the corrected or augmented description may be printed on a label 21 as shown in FIG. 2.

To explain the operation of the controller 10, reference will be made to FIG. 3 which shows the keyboard 20 in greater detail, and to FIGS. 4, 5 and 6 which illustrate the type of CRT display which is preferably called up by operator actuation of the keyboard.

Figure 3:
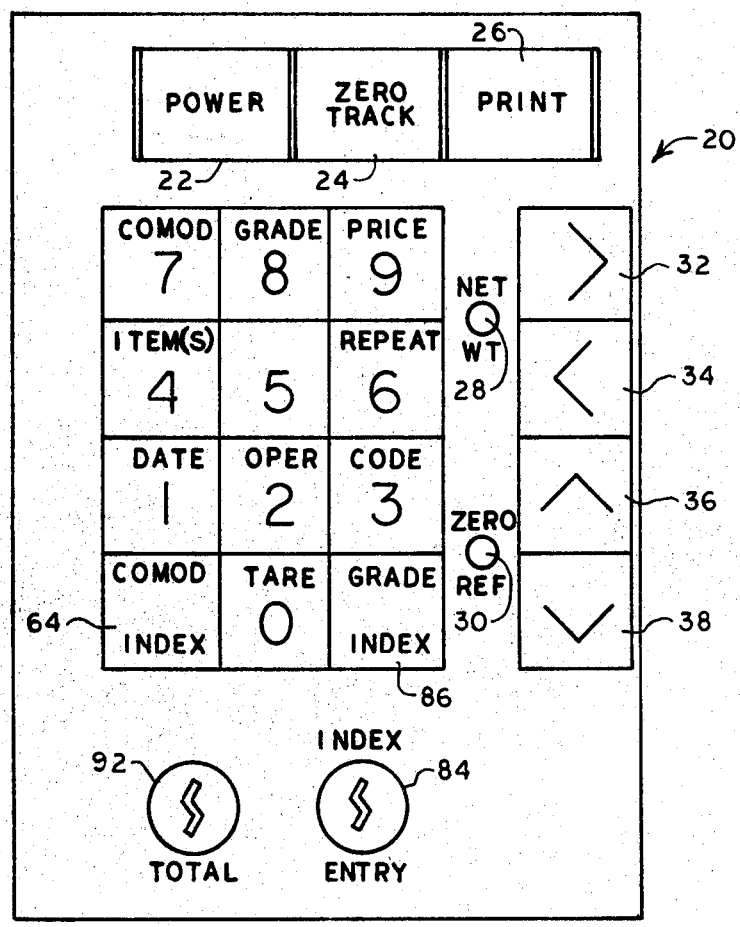
FIG. 3 depicts the keyboard for the controller of FIG. 1.
Figure 4:
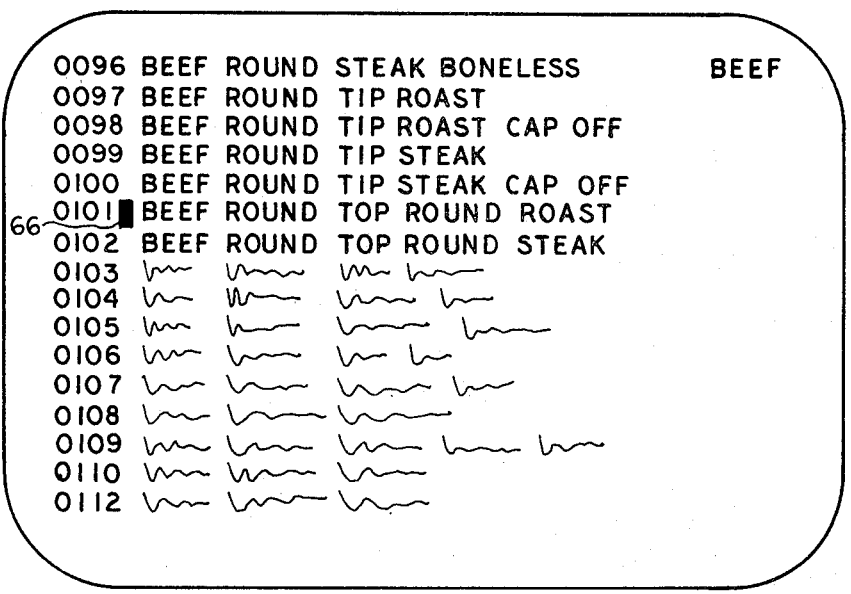
FIG. 4 illustrates the CRT faceplate and the type of commodity list displayed thereon.

As shown in FIG. 3, the keyboard may include a power key 22 for turning the controller on, and a zero track key 24 to place the controller in a zero track mode in which any debris accumulated on the scale will be compensated for in determining the weight of a commodity on the scale. A print key 26 is included for instructing the controller to activate the label printer for printing a label, even though no package is on the scale. The print key 26 may be used, for example, when it is desired to print a test label or when manually labeling preweighed commodities.

The keyboard may also include a net weight lamp 28 to indicate that a commodity's net weight (as opposed to its gross weight) is being used by the controller to compute the commodity's price. A zero reference lamp 30 may also be included to indicate, when on, that the scale is at absolute or reference zero.

The remaining illustrated keyboard keys exercise the more significant aspects of the controller 10. Among these keys are four cursor positioning keys 32, 34, 36 and 38. As described below, the controller's CRT displays a movable cursor along with its display of commodity information. The cursor key 32 may be actuated to move the cursor to the right horizontally, the key 34 may be used to move the cursor to the left horizontally, the key 36 may be used to move the cursor upwardly, and the key 38 may be used to move the cursor downwardly. The controller's response to actuation of any of these cursor positioning keys is described in more detail below.

Also included in the keyboard is a group of numbered keys bearing the numbers 0 through 9. These numbered keys are used by an operator to enter a commodity index number into the controller to cause the controller to display an alpha description of the commodity associated with the entered index number. On each of the numbered keys, additional indicia is included to designate another function of that key. For example, the number 9 key includes the notation "price" to indicate that actuation of this key will enable an operator to manually enter a commodity price into the controller. The functions of the other illustrated keys are described below concurrently with a description of the operation of the controller 10.

Referring again to FIG. 1, packaged commodities 40, 42 and 44 are shown at various stages of being processed. The packaged commodity 40 is shown as disposed on rollers 46 comprising part of an input feed path to the scale 12, the packaged commodity 42 is shown as resting on the scale 12, and the commodity 44 (which had been previously weighed) is now disposed at a label application station. Transport of the packages from the rollers 46 to the label application station is effected by a motor driven cam assembly (not shown) and occurs as follows. After the package 42 has been weighed and is ready to be moved to an intermediate package positioning station, a pair of guide arms 48 and 50 move upwardly, then move to the left and down so as to abutt the package 42, and then move to the right again to transport the package 42 to the package positioning station and, thereafter, to the label application station. As that occurs, the arm 50 sweeps the preceding package 44 off the label application station. Concurrently with each cycle, the rollers 46 are raised to feed the commodity 40 to a set of motor driven rollers 52 for projecting the package 40 onto the scale 12. As each commodity arrives at the scale 12, it is weighed and its price is computed by the controller 10. The CRT 18 displays an alpha description of the product being weighed, its price, and other information. The controller 10 then activates the label printer 14 for printing a label such as that shown in FIG. 2. It should be noted that this label includes a UPC code 54 which identifies the commodity, an alpha description 56 which describes the commodity in human readable form, as well as the other information illustrated in FIG. 2. After the label has been printed, it is siezed by a vacuum assisted transfer arm 58 which rotates to transfer the label to another arm 60. The arm 60 then descends to apply the label to the commodity. A compactor 62 may be included which descends to press the label onto the commodity package securely.

The manner in which an operator sets up the controller 10 to provide the type of high speed commodity processing referred to above will now be described. It should be understood first, however, that each commodity to be processed may be associated with a unique commodity index number which the controller 10 may use to carry out its functions. Conventionally, these index numbers, along with their associated commodity descriptions, are included in a printed look-up table which the operator refers to. The present controller is designed to do away with the need for such a look up table. If the operator does not remember the index number for the commodity to be processed, or prefers not to use this number, he or she actuates a commodity index key 64 (FIG. 3) on the keyboard. In response, the CRT 18 displays one page of a commodity index along, if desired, with the index number of each commodity. For example, FIG. 4 illustrates one such page of a commodity index as displayed by the CRT 18. The illustrated page includes, in its upper right hand corner, a notation that the commodities on this page are all "beef". On the left side of the commodity index are the index numbers, next to which is an alpha or human readable description of the various beef commodities. In addition, the CRT displays a movable cursor 66 which may be used by the operator to select a particular commodity of those displayed, as in FIG. 4. The cursor 66 is moved adjacent the commodity to be processed by actuation of the cursor up position key 36 and the cursor down position key 38. Thus, if the operator wishes to move the cursor 66 downwardly from its position shown in FIG. 4, the cursor down key 38 would be actuated; to move the cursor 66 upwardly, the cursor up key 36 would be actuated.

If the particular commodity to be processed is not shown on the displayed commodity list page, the cursor down key 38 may be actuated to move the cursor all the way to the bottom of the displayed page. When the cursor reaches the bottom of the page (item No. 0112 in FIG. 4), the controller 10 automatically flips to the next commodity list page to display another list of commodities with the cursor at the bottom of the page. Continually actuating the cursor down key 38 causes yet further pages to be flipped automatically. When the desired commodity list page is reached, the key 38 may be deactuated and then the cursor up key 36 may be actuated to move the cursor 66 adjacent to the commodity description which is desired.

Commodity list pages are flipped in an opposite direction by continued actuation of the cursor up key 36. Whichever cursor positioning key is used, the result is that one page after another of the commodity list is displayed on the CRT without the need for moving the cursor completely through every commodity description shown on successive pages. The entire list of commodities including beef, fish, poultry, etc., may be rapidly displayed to the operator in this manner.

When the operator has positioned the cursor 66 adjacent the description of the commodity which is to be processed, the commodity index key 64 is actuated again. This causes the controller 10 to extinguish the previously displayed commodity list and to display instead, a complete description of the commodity and any other preprogrammed data which was previously identified by use of the cursor. For example, if the cursor is left in the position shown in FIG. 4, and the commodity index key 64 is then actuated, the CRT extinguishes the display shown in FIG. 4 and substitutes for it the display shown in FIG. 5.

Figure 5:
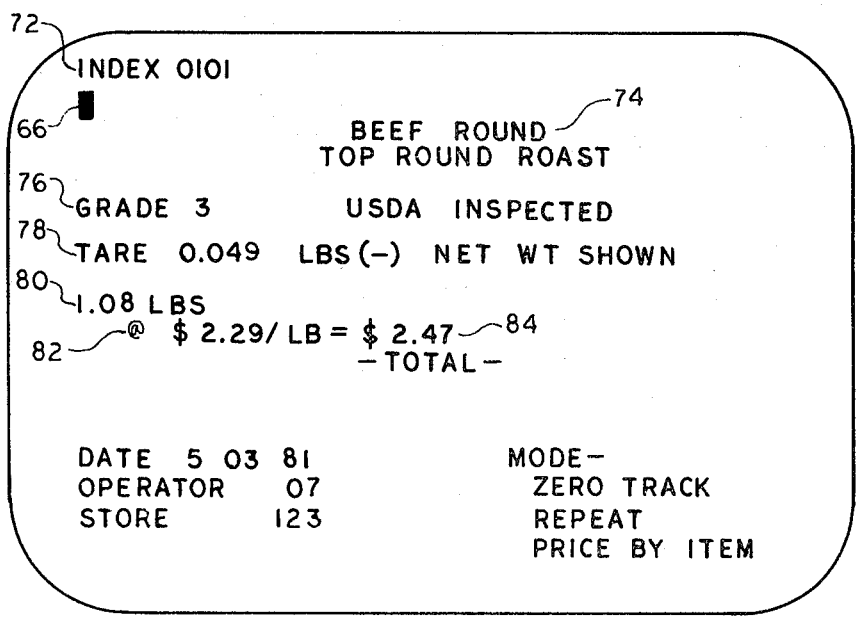
FIG. 5 illustrates the type of commodity description displayed on the faceplate of the controller's CRT.
Figure 6:
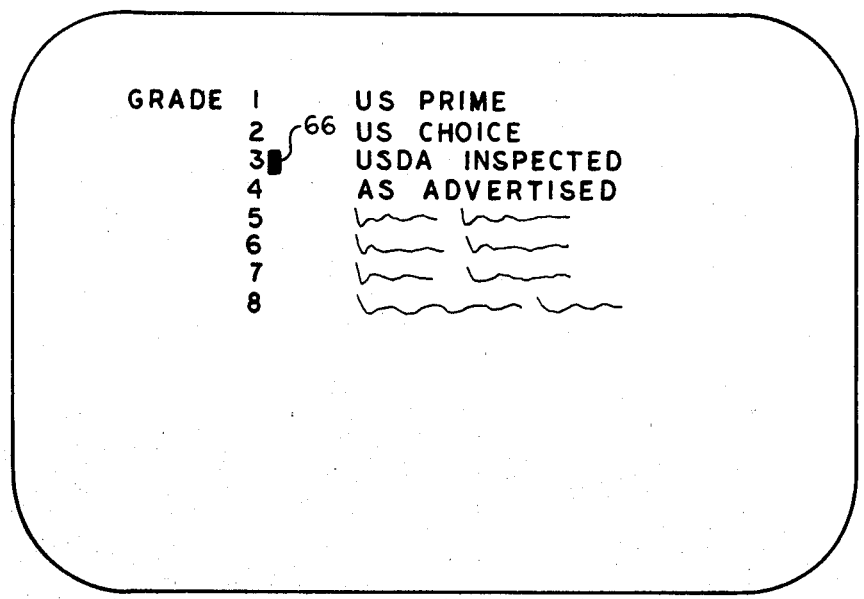
FIG. 6 shows the type of grade list displayed on the faceplate on the controller's CRT.

Referring to FIG. 5, the CRT includes the commodity index number 72, the alpha description of the selected commodity at 74, the grade of the selected commodity at 76, and the tare of the commodity at 78. The display also indicates the weight of the commodity on the scale at 80, the price per pound of the commodity at 82, and the total price of the commodity as computed by the controller at 84. As shown, the lower left hand corner of the display may include the date, a number designating the operator, and another number designating the particular store in which the processing takes place. At the lower right hand corner of the display, the CRT indicates the mode in which the controller is operating. As indicated, the controller may operate in a zero track mode, a repeat mode, and a price by count mode. All the information shown on the display illustrated in FIG. 5 is printed on the label, with the exception of some of the information relating to the mode in which the controller is operating and the grade index number, if any.

During this set up procedure, the operator may wish to change some of the information appearing on the display shown in FIG. 5 before weighing the selected commodity. For example, the operator may want to change the alpha description at 74 to more accurately reflect the type of commodity to be processed. The grade appearing at 76 may require changing, or any of the other information shown therein may require change. The way in which such changes may be made is described immediately below.

If the operator desires to change the price per pound which is indicated at 82, or if the price per pound had not been previously entered into the controller, the operator actuates the price key shown in FIG. 3. This price key also functions as the number 9 key for entering numerical data, but the first actuation of any of the keys which has both a numeral identification thereon and a function shown thereon instructs the controller to execute the function the first time the key is pressed. The second time the key is pressed, the key enters numerical data to the controller 10.

With the price key actuated, the controller is instructed that a price change is about to be entered. In response, the controller moves the cursor 66 to the area 82 at which the price per pound is shown. The cursor remains there for a time out period during which the operator may manually enter a new price per pound by actuating various numbered keys shown on the keyboard of FIG. 3. As this numerical data is being entered, the new price appears on the CRT, with the cursor following each new entry.

The controller is now programmed to use the newly entered price per pound in computing the price of commodities to be weighed, and that newly entered price per pound will be printed on a label in the same manner as it is shown on the CRT display. It should be noted, however, that the steps taken above to change the price per pound do not permanently change the old price per pound which had been previously entered in the controller's memory. However, the newly entered price per pound will be used to compute and print labels as long as the same commodity is being processed. When the computer is instructed to display a different commodity, the newly entered price per pound data will be lost.

To permanently store in memory a newly entered price per pound, the operator places a key into an index entry key slot 84 (FIG. 3) and turns the key. This permanently stores the newly entered price per pound in memory as a substitute for the previously stored price per pound of this particular commodity.

The grade designation at 76 and the tare weight at 78, may also be changed in the same general manner as described above. Thus, to change the grade designation, the operator actuates the grade key (key number 8) and then actuates the number key associated with the new grade number to be entered. Likewise, the tare key (number 0 key) is actuated preparatory to changing the tare. To enter a grade designation, tare or unit price permanently in the controller's memory, the index entry key is used as described previously.

The date, the operator number and the store number are not permanently stored in memory. They are merely displayed by the CRT until next changed by the operator or until the controller is powered down. All may be changed by actuation of the correspondingly designated keys followed by entry of the appropriate numerical data via the keyboard.

In some instances, the operator may wish to change a grade designation but may not recall each available grade designation. Therefore, the controller's memory stores a list of the available grade designations for selection by the operator. To determine which grade designations are available, the operator actuates a grade index key 86 and the controller responds by extinguishing whatever had been previously displayed on the CRT and by displaying a grade index such as that shown in FIG. 6. To select which of these grades are to be displayed at the location 76 in FIG. 5, the operator employs the cursor positioning keys 36 and 38 to move the cursor 66 adjacent the desired grade. The grade index key 86 is ten actuated again and the display reverts to that shown in FIG. 5 with the newly selected grade indication shown at the location 76.

The keyboard also includes an item(s) key (key number 4) which may be actuated to price the commodities on a per item or items (by count) basis as opposed to a per pound basis. In this mode, each commodity package is given the same price regardless of its weight. When the item(s) key is pressed, the CRT display indicates that the controller is operating in the price by item(s) mode as shown in the lower right hand corner of FIG. 5.

In situations where it is desired to print a plurality of identical labels regardless of mode, the operator presses the repeat key in FIG. 3 (key number 6). The controller then causes the CRT to display the repeat notation shown in FIG. 5 and a succession of labels are printed, all of which carry the same information as displayed by the CRT and regardless of actual commodity weight or any other commodity characteristic. The zero track mode of operation described previously is entered by actuation of the zero track key 24. When this key is pressed, the controller causes the CRT to display the zero track indication which is also shown in FIG. 5.

As indicated previously, the operator may also modify the alpha description of the commodity to be processed. For example, if the word "round" in the alpha description at 74 in FIG. 5 is to be changed, the operator actuates the right and left cursor positioning controls 32 and 34 (FIG. 3) until the cursor is located over the letter r in the word "round". The operator then actuates the cursor up position key 68. This causes letters of the alphabet to appear at the position of the cursor in alphabetical sequence, one after the other. When the proper letter is displayed, the operator releases the cursor key 36. Alternately, the cursor positioning key 30 may be actuated to cause letters of the alphabet to appear sequentially in the reverse order. When either of the keys 36 and 38 are deactuated, the character then appearing on the CRT is held in display. The next successive character may be inserted by actuation of the cursor positioning control 32 to move the cursor to the next letter and then either of the keys 36 and 38 are actuated to again cause a sequence of alpha characters to appear on the CRT. As before, deactuation of either of these keys causes the letter which last appeared on the CRT to be held in display. When the operator has finished modifying the text, those modifications may be permanently stored in memory by employing the key to the index entry 84.

Not only can existing words be changed as described above, but additional words may be added to the alpha description using the same procedure. It is possible, as well, to compose an entirely new and additional commodity entry and, by key entry, to add it to the index.

After the foregoing set up procedure has been completed, the CRT displays all the information shown in FIG. 5 as modified by the operator. Commodities may then be fed to the scale 12, their weight and price calculated and displayed on the CRT, and a label printed which shows all the information displayed in FIG. 5 with the exception of the mode indicia.

The previous discussion relating to the display of the commodity index (FIG. 4) assumed that the operator did not remember the index number of the commodity processed or did not wish to use a number address. In this case where she does known the commodity number and does not wish to use the commodity index list, the operator merely actuates the commodity key (key number 7) in FIG. 3 to condition the controller to receive a manually entered commodity index number. That number is manually entered by actuating the various numbered keys on the keyboard which correspond to the commodity index number. In response, the controller displays the commodity information shown at FIG. 5 for the index number which has been manually entered. The procedure then continues as described previously. It should be noted at this point, however, that, should the operator enter an incorrect index number, he or she will be immediately aware of that fact upon reading the alpha description shown at 74 in FIG. 5.

The controller 10 may also include a total and/or subtotal, demand key switch 92 (FIG. 3). By insertion and turning of a totaling key, the controller will cause the printer to print out a subtotal or total for all transactions since last totals were taken. All this information, thus automatically printed on a label, provides a record of the commodity processing which has taken place since the totaling key was last used.

Figure 7:
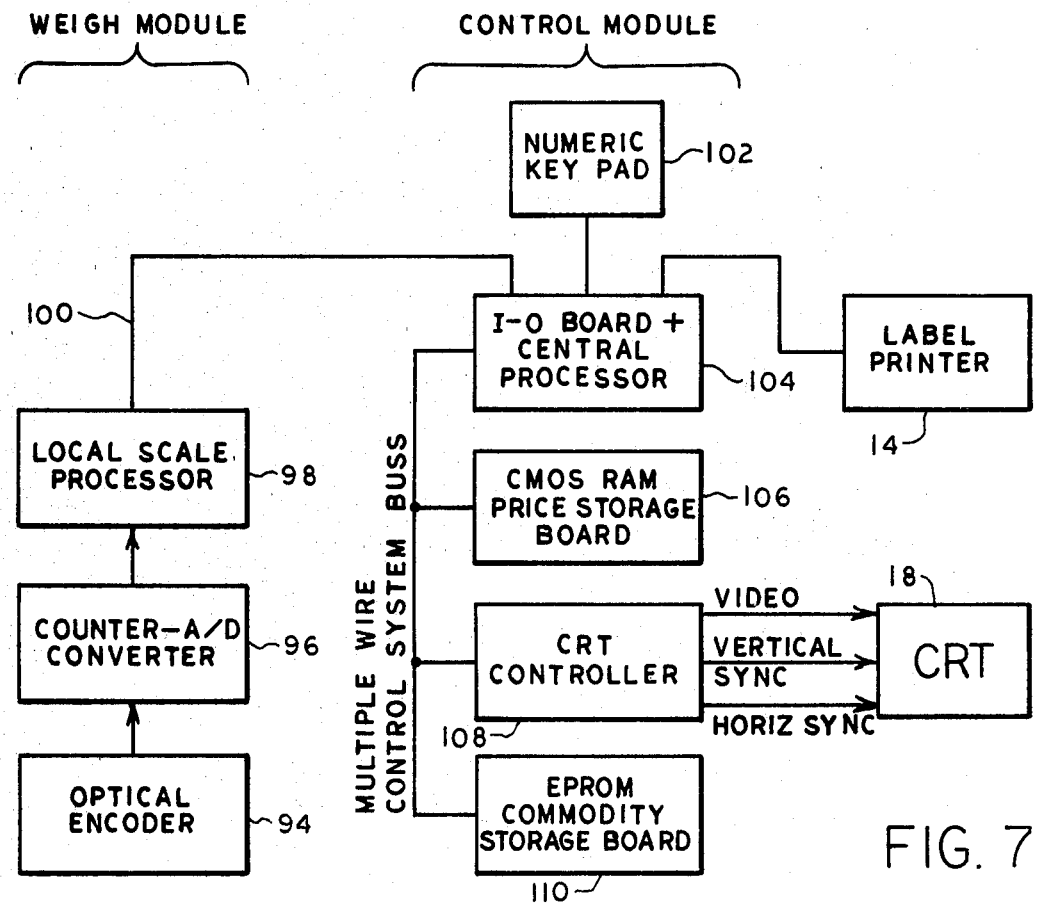
FIG. 7 is a block diagram of the electronics in the controller and illustrates how it interfaces with the label printer and a conventional scale.

Referring now to FIG. 7, a block diagram is shown to indicate the components of a weigh module associated with the scale, a control module which includes the components in the control 10, and the connections between the control module and the label printer and the CRT. As shown, the weigh module may include an optical encoder 94, a counter-A/D converter 96 and a local scale processor 98. These components of the weigh module operate conventionally to provide a serial digital representation of the averaged weight of a commodity on the scale. This information is sent to the control module via a lead 100.

Included in the control module is a numeric key pad 102, an I-O board and central processor 104, a CMOS RAM storage board 106, a CRT controller 108, and an EPROM (or EEPROM) commodity storage board 110. The latter device may be a 32K×8 memory for storing the alpha descriptions of commodities.

The CRT controller 108 is a conventional device which supplies video, vertical sync and horizontal sync to the CRT 18. It may be of the type designated as Model No. VB1C, manufactured by SSM Microcomputer Products, of San Jose, Calif.

The price storage board 106 may be a 1K×8 Static memory which stores the commodity prices, tare and grade entries. A backup battery may be included in the storage board 106 to ensure that the memory therein remains non-volatile in case a power failure occurs.

The central processor in the block 104 may be a conventional microprocessor such as Model No. SBC-100 manufactured by S. D. Systems of Dallas, Tex. The output of the processor 104 is applied to the label printer 14 for actuating the latter device to print the information previously described.

Figure 8:
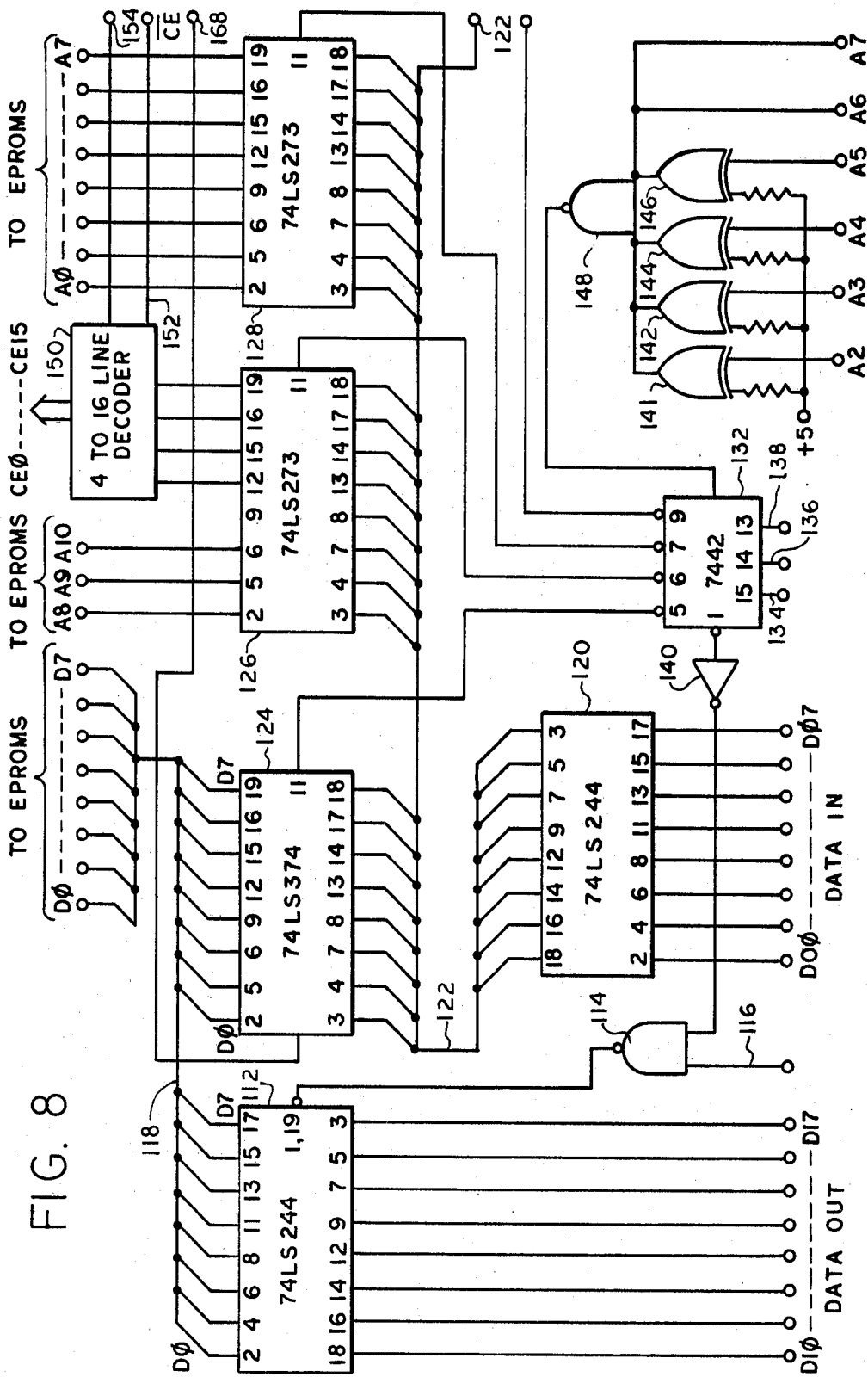
FIGS. 8, 9 and 10 show the EPROM commodity storage board of FIG. 7 in greater detail.

Referring now to FIG. 8, a portion of the EPROM commodity storage board is shown in more detail. In this figure and the other figures which illustrate details of the components shown in FIG. 7, some of the integrated circuits are illustrated with their commercial identifying numbers and their pin numbers. Hence, a detailed description of how such integrated circuits are connected to each other is unnecessary.

Included on this board is a data buffer 112 which receives data inputs via lines D∅-D7 (buss 118) from the EPROMs (FIG. 10) for application to the microprocessor on the board 104 (FIG. 7) via output lines Di0-Di7. The data output at these leads corresponds to the commodity descriptions. A gate 114 receives a control input via lead 116 from the microprocessor to enable data in the buffer 112.

Commodity information is received from the microprocessor via data input lined D0∅ thrugh D∅7 which are coupled to a data buffer 120. Also coupled to the buffer 120 is a buss 122 which is connected to a data latch 124, to a high address latch 126, and a low address latch 128. A control latach 130 in FIG. 9 receives the same data on a lead 122' from the lead 122. The leads D0-D7 of the latch 124 are coupled to the buss 118 for application to the EPROMS which are shown in FIG. 10. The same EPROMS receive address signal A0 through A10 from the latches 126 and 128.

Additional control signals from the microprocessor for latching data through the storage board 110 are input to a device 132 via leads 134, 136 and 138. Pin 1 of this device is coupled via a gate 140 to the gate 114. Pins 5, 6, 7 and 9 of this device are coupled to pin 11 of the latches 124, 126, 128 and 130.

Chip addresses are received from the microprocessor via address inputs A2 thröugh A7 which couple to four exclusive OR gates 140,142, 144, 146 and another gate 148. The output of the gate 148 is applied to pin 12 of the device 132.

Chip enable signals $\overline{CE0}$ through $\overline{CE15}$ are provided for the EPROMS of FIG. 10 by a 4 to 16 line decoder 150. Inputs to this decoder are the illustrated outputs of the latch 126, a $\overline{CE}$ signal received from the circuitry shown in FIG. 9 via a lead 152, and a polarity signal from that same circuitry via line 154.

Figure 9:
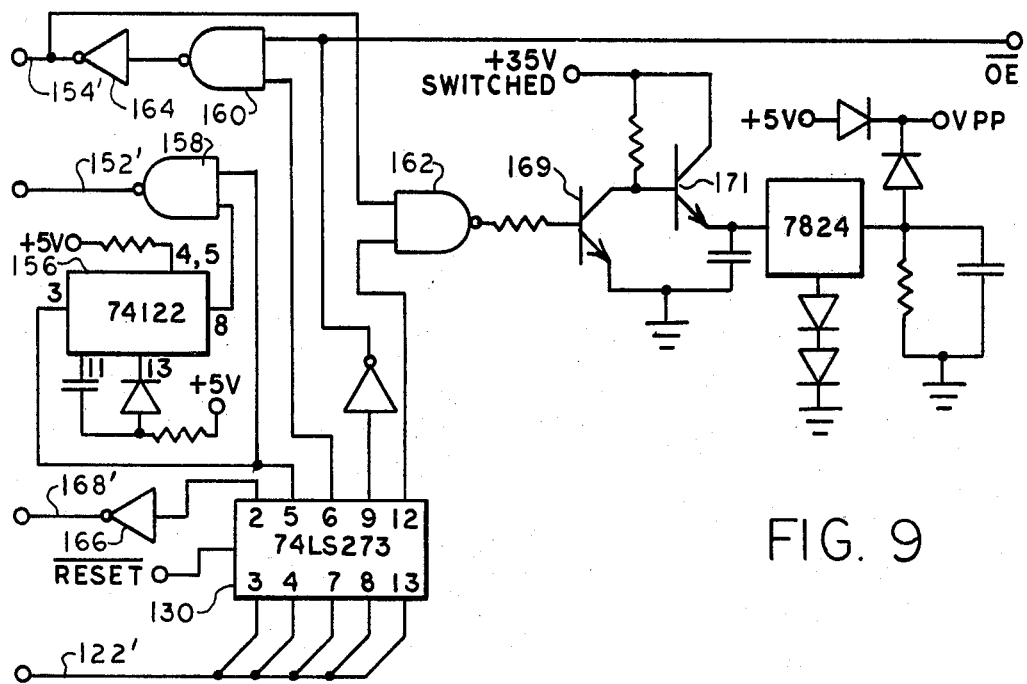
Figure 10:
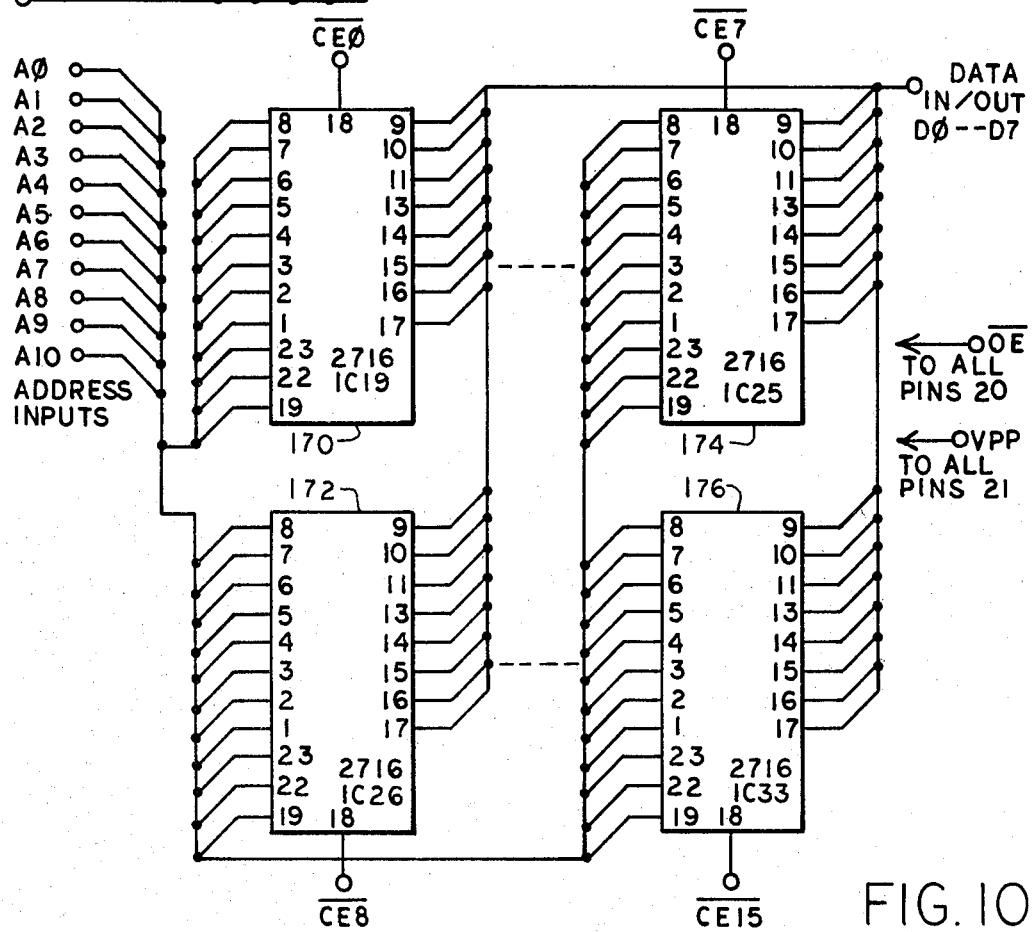

Referring now to FIG. 9, this illustrated portion of the EPROM storage board 110 includes the previously mentioned control latch 130 which is coupled via the buss 122' to the buss 122 in FIG. 8. Also provided are a 50 millisecond one shot 156, gates 158, 160 and 162, inverters 164 and 166, and the other illustrated components. The output of the gate 158 provides the CE signal to the decoder 150 in FIG. 8 via the lead 152', the output of the inverter 164 couples to lead 154 in FIG. 8 via the lead 154', and the inverter 166 couples to pin 1 of the latch 124 in FIG. 8 via a lead 168'.

The output of the gate 162 drives a transistor 169 whose collector drives another transistor 171. The collector of the latter transistor receives a switched +35 volt signal when data in the EPROMS is to be changed. The manner in which this switched signal is developed is described later. Suffice it to say that the illustrated circuitry provides an output VPP which corresponds to +35 volts when the EPROMS are being programmed and +5 volts at other times.

Referring now to FIG. 10, 4 4 EPROMS 170, 172, 174 and 176 are shown. In practice, 16 such devices are used, all of which are connected in the manner shown in FIG. 10. That is, the address inputs from FIG. 8 are applied to the address input pins as shown, the data output leads D0 through D7 are received from the various EPROMS in the manner indicated, and the chip select signals are applied to pin 18 of each of the EPROMS from the decoder 150 of FIG. 8. In addition, the signals $\overline{OE}$ and VPP (from FIG. 8) are applied to pins 20 and 21, respectively, of each of the ERPOMS.

Figure 11:
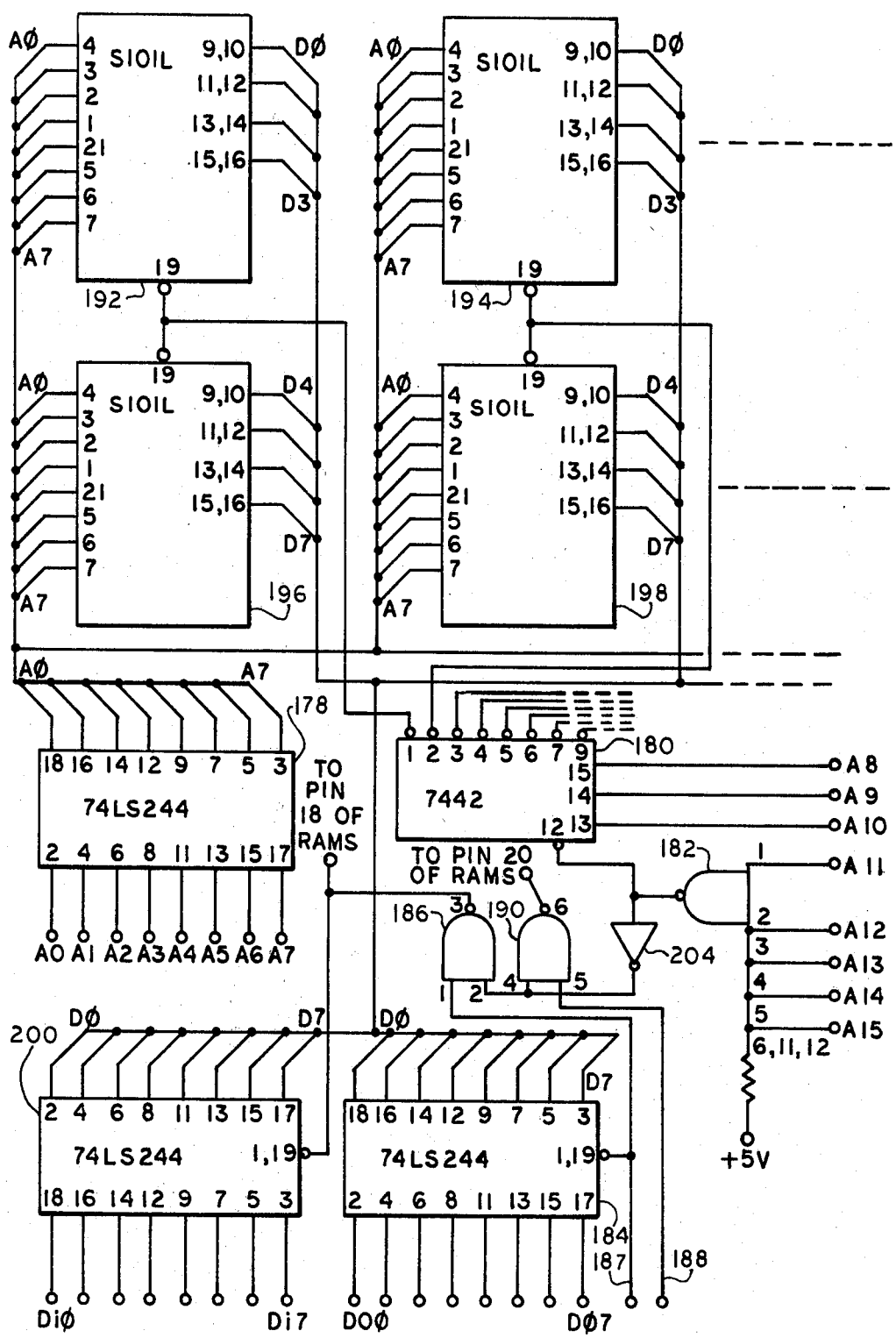
FIG. 11 shows the CMOS RAM price storage board of FIG. 7 in greater detail.

Referring now to FIG. 11, some of the details included on the CMOS RAM board 106 are shown. Power supply and backup battery circuitry has been eliminated from this figure for simplicity. Inputs to the illustrated circuitry include address lines A0 through A7 which are applied to a buffer 178 from the central processor board 104. Address inputs A8 through A10 from the board 104 are applied to a decoder 180, and address inputs A11 through A15 from the board 104 are applied to a gate 182. Additional inputs include a control signal which is coupled via a lead 187 from the central processor board 104 to a buffer 184 and to a gate 186. A write enable signal from the board 104 is coupled via a lead 188 to another gate 190, the output of which is coupled to pin 20 of each of the CMOS RAMS 192, 194, 196 and 198. Although only four such RAMs are shown in practice, sixteen of them are included, and all are provided with address inputs and data outputs as shown for the RAMS 192 through 198.

Price, tare and grade data is coupled from the RAMS through a buffer 200 to the data output lines Di0 through Di7 for application to the I-O and central processor board 104. Data from processor board 104 is coupled to buffer 184 via input leads D0∅-D07 for application to the RAMs. A board select signal is derived from the output of the gate 182 for application to an inverter 204 and the decoder 180. With these inputs and the address inputs A8 through A10, the decoder 180 develops chip select signals at its pins 1 through 9 for application to the RAMs.

Figure 12:
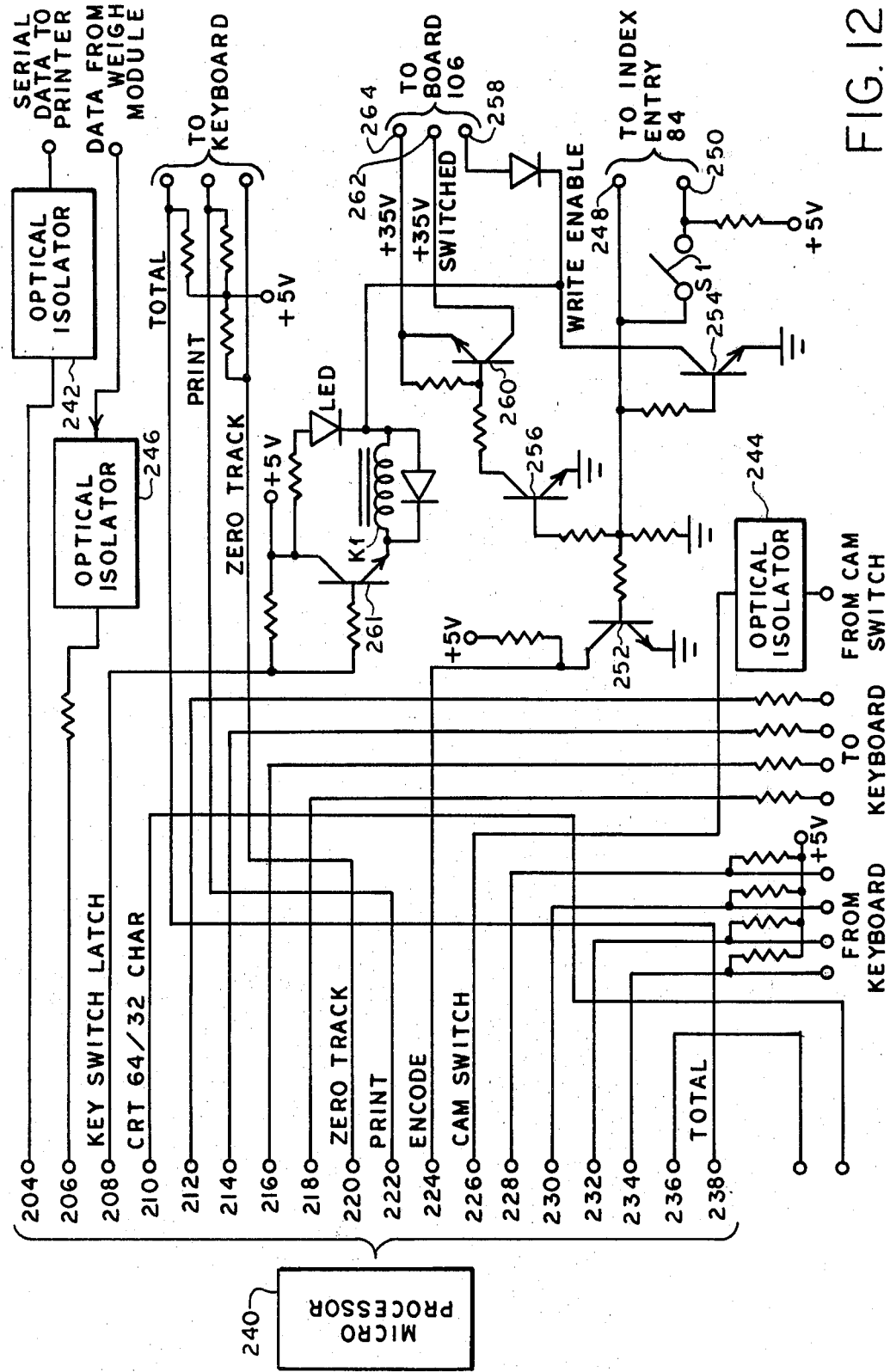
FIG. 12 shows the I-O board of FIG. 7 in greater detail.

Referring to FIG. 12, the I-O board is shown as including terminals 204 through 238 for connection to a microprocessor 240. Signals from the keyboard are coupled to the microprocessor via terminals 228, 230, 232 and 234. Signals from the microprocessor to the keyboard are coupled thereto via terminals 212, 214, 216 and 218. Leads coupled to the remaining terminals carry signals whose character is identified in the drawing.

As shown, a conventional optical isolator 242 couples serial data from terminal 204 to the label printer. A second optical isolator 244 couples a cam switch signal to terminal 226 and to the microprocessor 240. A third optical isolator 246 couples data from the weigh module to the microprocessor via the terminal 206.

Control of the total, print and zero track functions is achieved by coupling signals identified with those functions to the keyboard via terminals 238, 222 and 220 respectively.

It will be recalled that it is possible to permanently store in memory the changed or modified data input by the operator by using the index entry 84 (FIG. 3). For this purpose, the index entry 84 is coupled to terminals 248 and 250 for sending a price encode signal to the microprocessor via a transistor 252 and the terminal 224. The encode signal is also applied to transistors 254 and 256. The transistor 254 now conducts to initiate a current path for a relay K1 and to establish a write enable signal at terminal 258. The transistor 256 and another transistor 260 conduct to switch a +35 volt program power signal from terminal 264 to terminal 262. This signal at terminal 262 is coupled to the collector of transistor 171 (FIG. 9) for application to the VPP inputs of the EPROMS in FIG. 10.

Referring again to the transistor 252, its on condition sends an encode signal to the microprocessor which responds by sending a high level memory write control signal (key switch latch) to a transistor 261 via the terminal 208. The transistor 261 now conducts to couple current through the relay K1 from the current path initiated by the conduction of transistor 254.

Actuation of the relay K1 causes a switch S1 (across terminals 248 and 250) to close so as to latch the price encode signal. Thus, the switched 35 volt signal is maintained at terminal 262 as long as the microprocessor holds transistor 261 on, irrespective of the condition of the index entry 84.

The significance of the arrangement described above is that two conditions must be met before programming of an EPROM occurs: the key must be turned in the index entry and the microprocessor must develop its output to terminal 208. Hence, any inadvertent output of the microprocessor is ineffective for programming an EPROM.

Figure 13:
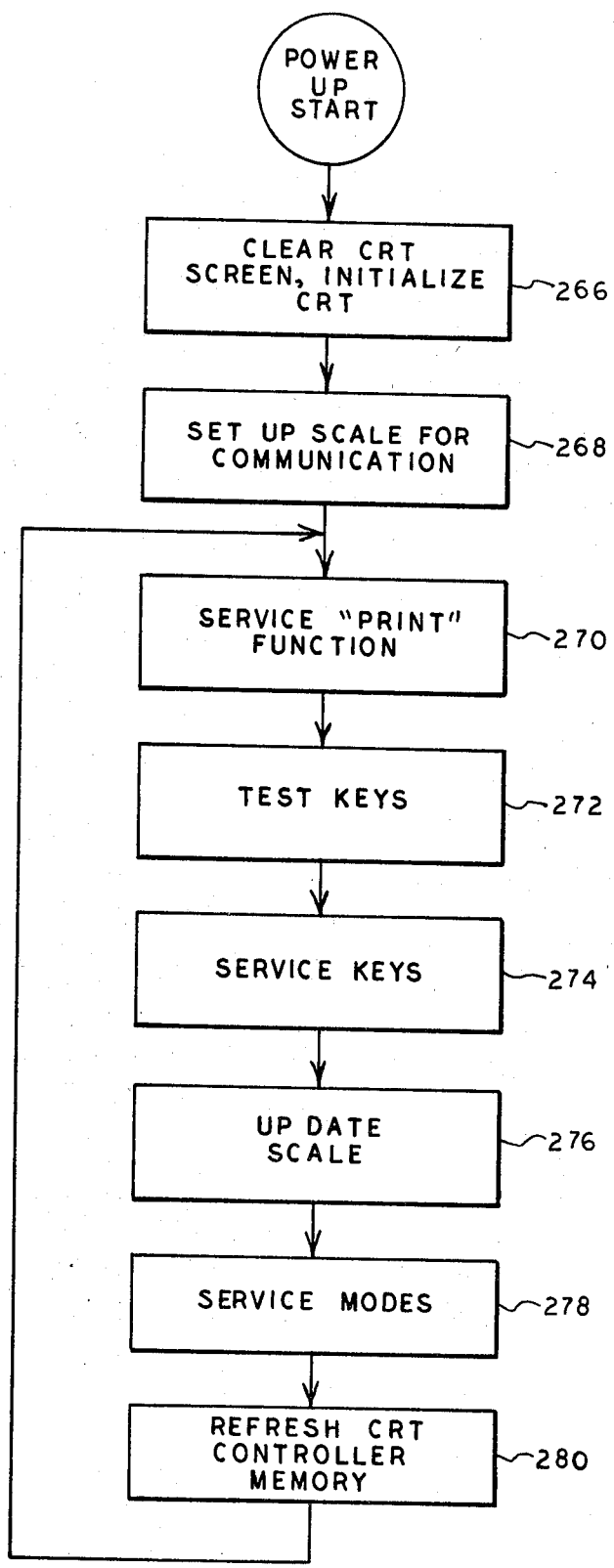
FIG. 13 is a flow chart which illustrates generally how the microprocessor shown in FIG. 12 may be programmed.

The central processor in block 104 may be programmed according to a software package shown in FIG. 13, to which reference is now made. Blocks 266 and 268 of this package together initialize the presentation of data on the CRT and initialize all status registers of the central processor. These blocks are executed only on power-up.

Blocks 270 through 280 are continuously executed in a loop. Basically, they respond to any changes in external conditions such as new scale data, closure of keyboard switches, and closure of a "print" cam switch used to index the commodities on their way to the label application station.

Block 270 issues a print request to the printer. To provide the print request, the "print" cam switch must close and data must previously have been sent to the printer. See the description of blocks 276 and 278 below.

Blocks 272 and 274 service all keyboard activity. When a key is pressed, this software decides which "key" mode to enter, what to do with further keyboard closure, and when to end servicing of the present "key" mode.

One of twelve modes may be entered:
 1. Tare: If the scale is at zero, digital tare may be entered. If the scale is non-zero but less than one pound, the present weight is entered as tare, effectively re-zoning the scale.

2. Commodity: A commodity number is entered by the operator. The controller than looks up the corresponding commodity description, price, and tare and displays them on the CRT.
3. Price: When pressed, further entry of keyboard data changes the displayed price.
4. Date: When pressed, new date information is entered.
5. Operator: When pressed, a new "operator" code is entered.
6. Cursor: When pressed, the cursor moves along the commodity description area. The commodity description may then be changed by pressing the keys 36 and 38.
7. Grade: When pressed, a new grade code may be entered. The controller then looks up the corresponding new grade description and displays it on the CRT screen.
8. Store code: When pressed, a new store code may be entered.
9. Commodity Index: When pressed, a full page of commodity descriptions is displayed. A cursor is positioned to indicate the present commodity. The cursor may be moved up or down to point to a different description. When the cursor is at the bottom or top of the page, the next or previous page is then displayed. This "paging" system allows hundreds of commodities to be viewed in a few seconds. Upon completion of this mode, the commodity description corresponding to the present cursor position is displayed on the screen.
10. Grade index: When pressed, a single page of grade descriptions is displayed. A cursor is positioned over the present grade number. As in mode 9, the cursor may be moved up or down to point to a new description. On completion of the mode, the grade description corresponding to the present cursor position is displayed Modes nine and ten considerably simplify the entering and changing of information. The operator need not know the description or grade number as in mode two or seven. Further, no external lists of information need be kept as all the information becomes almost instantly available on the screen.

11. Item: When pressed, the controller enters a "price by item" mode where the pricing is fixed for an item, rather than being variable depending on weight.
12. Items (Count): When pressed, the controller enters a "price by count" mode where the pricing is fixed for a multiple of items. The ticket printed will present "2 for $4.99", for example.

Additionally, blocks 272 and 274 allow permanent storage of modified description, price, or tare. When the index entry switch 84 is actuated, a compare is made between the data on the screen and the data present in the price storage and commodity storage boards. If tare or price has changed, the new tare and price is simply re-stored in the price storage board, which is physically a CMOS RAM. If the commodity description has changed, the rewriting procedure is more complex. Since the commodity descriptions are physically contained on an "EPROM" memory board, the old description cannot be simply over-written. Instead, new description is written into an unused portion of the EPROM memory, the old commodity description address pointer is zeroed out to indicate the description has changed, and a new address is entered in a "secondary lookup" table. Using this system technique, the EPROM memory retains all the non-volatility advantages of EPROM while taking on the versatile alterable characteristics of RAM memory.

Blocks 276 and 287, update scale and service modes, update information from the weigh module, multiply weight by price per pound to produce total amount, and decide whether or not to send data to the printer. Data is sent to the printer if the scale is stable and non-zero. Sending data to the printer sets a flag which block 270 uses to determine if a print request is to be issued.

The scale contains its own separate micro-computer to pre-process scale data. Data is gathered, averaged, and flags are set to determine scale status: zero, stable, and overrange. The data from the scale is sent to the central controller through a single serial channel, considerably simplifying the intercabling from scale to controller. Thus, two advantages come from placing a microcomputer at the scale: First, the central controller is freed from the complex task of acquiring scale data; second, the scale to controller wiring is considerably simplified.

Block 280 functions to refresh CRT data only during the blanked vertical interval of the CRT. This eliminates contention between the central controller and CRT controller which would otherwise cause random and annoying data to flicker across the screen. Additionally, block 280 provides the main time base of 1/120th of a second (the vertical sweep rate) on which all other software timing is based.

As described, the present arrangement provides a distributed processing system whose three separate microcomputers in the scale, control module and printer are linked by simple single wire communication lines. This allows: (1) the use of a separate processor in the scale to simplify central controller software and cabling requirements; (2) the use of a CRT index library of descriptions to eliminate any external lookup charts; and (3) the use of EPROM and alterable table pointers along with unused EPROM to maintain a non-volatile yet alterable library of commodity descriptions.

The general description given above of the software package is believed to be sufficient. The appendix which is included herewith illustrates the instructions which may be used in programming the more significant aspects of the logic. Also included in the appendix is a computer language listing setting forth the software package in detail. The contents of the appendix are included in this specification by reference.

Although the invention has been described in terms of a preferred embodiment, it will be obvious to those skilled in the art that many modifications and alterations may be made. Accordingly, all such modifications and alterations are intended to be considered as within the spirit and scope of the invention as defined by the appended claims.

| SYSTEM FLOWCHART | |
|---|---|
| 1A | Start of print function |
| 2A | Print switch: Yes - go to 3A, No - go to 11A |
| 3A | Scale OK: Yes - go to 4A, No - go to 11A |
| 4A | Wait ½ second |
| 5A | Go to 1B (send print data) |
| 6A | Wait ½ second |
| 7A | Send print command |
| 8A | Reset scale communication flags. Clear totals if |

SYSTEM FLOWCHART

|      | -continued |
|------|------------|
|      | total flag on. Clear total flat |
| 9A   | Reset ready to print flag: go to 17A |
| 10A  | Total switch on: Yes - go to 11A, no - go to 12A |
| 11A  | Set "Total Flag": Go to 6A |
| 12A  | Cam switch on: yes - go to 13A, No - go to 16A |
| 13A  | Cam flag on: Yes - go to 17A, No - go to 14A |
| 14A  | Set Cam Flat |
| 15A  | Ready to print flag on? Yes - go to 7A, no - go to 17A |
| 16A  | Clear Cam Flag |
| 17A  | Go to ID |
| 1B   | Start of send short message |
| 2B   | Send start character |
| 3B   | Send pic spacing ⎫ |
| 4B   | Send pic number ⎬ Send pic data |
| 5B   | Go to 1C (send UPC Data) |
| 6B   | Send Item?: Yes - go to 7B, No - go to 8B |
| 7B   | Send item spacing: Go to 15B |
| 8B   | Send count?: Yes - go to 9B, No - go to 10B |
| 9B   | Send count data: Go to 15B |
| 10B  | Send Total?: Yes - go to 11B, No - go to 12B |
| 11B  | Send Total: Go to 15B |
| 12B  | Totalize weight |
| 13B  | Send Weight |
| 14B  | Send price |
| 15B  | Set printer to large character |
| 16B  | Total?: Yes - go to 17B, No - go to 18B |
| 17B  | Send Total amount |
| 18B  | Send amount |
| 19B  | Total?: Yes - go to 20B, No - go to 21B |
| 20B  | Send total message: Go to 22B |
| 21B  | Send grade |
| 22B  | Send operator ⎫ |
| 23B  | Send store code ⎬ Send line 3 data |
| 24B  | Send data ⎭ |
| 25B  | Send commodity |
| 26B  | Send end character |
| 27B  | Go to 6A |
| 1C   | Start send UPC data |
| 2C   | Send line 1 command |
| 3C   | Send 6 initial UPC digits |
| 4C   | Calculate price check digit |
| 5C   | Send price check digit |
| 6C   | Send 4 digit price |
| 7C   | Calculate UPC check digit |
| 8C   | Send UPC check digit |
| 9C   | Go to 6B |
| 1D   | Start Button pushed test |
| 2D   | Reset button service flag |
| 3D   | Button pushed?: Yes - go to 5D, No - go to 4D |
| 4D   | Reset button pushed flag: Go to 15D |
| 5D   | Previously pushed?: Yes - go to 6D, No go to 11D |
| 6D   | Alpha change or move cursor?: Yes - go to 7D, No - go to 15D |
| 7D   | Increment Repeat delay timer |
| 8D   | Repeat delay - timeout?: Yes - go to 9D, No - go to 15D |
| 9D   | Set repeat delay, increment timer |
| 10D  | Repeat timeout?: Yes - go to 13D, No go to 15D |
| 11D  | Set button pushed flag |
| 12D  | Set repeat delay timer |
| 13D  | Set repeat timer |
| 14D  | Set button service flag |
| 15D  | Go to 1E |
| 1E   | Start service button pushed |
| 2E   | Cursor home?: Yes - go to 3E, No - go to 8E |
| 3E   | Encode switch on?: Yes - go to 4E, No - go to 7E |
| 4E   | Previously on?: Yes - go to 8E, No - go to 5E |
| 5E   | Set encode button storage |
| 6E   | Go to 1F (record price) |
| 7E   | Go to 1G (record commodity) |
| 8E   | Button mode equal 0?: Yes - go to 9E, No - go to 11E |
| 9E   | Button service flag on?: Yes - go to 10E, No - go to 17E |
| 10E  | Go to 1I (Initiate button service) |
| 11E  | Button service flag on?: Yes - go to 12E, No - go to 14E |
| 12E  | Set service time-out |
| 13E  | Go to 1K (service button) |
| 14E  | Increment service time-out |
| 15E  | Time out?: Yes - go to 16E, No - go to 17E |
| 16E  | Go to 1L (end service button modes) |
| 17E  | Go to 1M |
| 1F   | Start of price storage |

|      | -continued |
|------|------------|
| 2F   | Calculate address from commodity number |
| 3F   | Convert screen price to ram form |
| 4F   | Calculate check sum |
| 5F   | Move price to memory |
| 6F   | Move tare to memory |
| 7F   | Move grade to memory |
| 8F   | Go to 7E |
| 1G   | Start write new commodity |
| 2G   | Look up start address of present commodity |
| 3G   | Zero?: Yes - Go to 4G, No - Go to 5G |
| 4G   | Look up entry in secondary table, set secondary flag, save pointer: Go to 6G |
| 5G   | Clear secondary flag, save table pointer & entry |
| 6G   | Find first open secondary table entry, save table pointer |
| 7G   | Get start address associated with table entry & save |
| 8G   | Look up old commodity |
| 9G   | Go to 1H (Convert new commodity to Rom form & save) |
| 10G  | Compare old commodity to new commodity |
| 11G  | Same?: Yes - go to 15G, No - go to 12G |
| 12G  | Put new commodity into Rom |
| 13G  | Put new start address into address table |
| 14G  | Clear old commodity start address |
| 15G  | Go to 8E |
| 1H   | Start convert commodity to Rom form |
| 2H   | Set line counter to 0, point to start of buffer, point to start of line |
| 3H   | Clear space count |
| 4H   | Fetch character from line |
| 5H   | Space?: Yes - Go to 6H, No - go to 8H |
| 6H   | Increment space counter |
| 7H   | End of line?: Yes - Go to 15H, No - go to 4H |
| 8H   | Space>1?: Yes - go to 10H, No - go to 9H |
| 9H   | Put a space into buffer: Go to 11H |
| 10H  | Add Hex 58 to # spaces, put into buffer |
| 11H  | Point to end of line |
| 12H  | Compare character to space |
| 13H  | Space: Yes - go to 12H, No - go to 14H |
| 14H  | Move non-space characters to buffer |
| 15H  | Move CRLF into buffer |
| 16H  | 2 Lines?: Yes - Go to 18H, No - go to 17H |
| 17H  | Point to next line: Go to 2H |
| 18H  | 10G |
| 1I   | Start initiate button service |
| 2I   | Go to: 3I, or 11I, 15I, 20I, 22I, 24I, 29I, 33I, dependent on button pushed. |
| 3I   | Initiate tare |
| 4I   | Tare non-zero?: Yes - go to 9I, No - go to 5I |
| 5I   | Weight zero?: Yes - go to 10I, No - go to 6I |
| 6I   | Weight in range?: Yes - go to 37I, No - go to 7I |
| 7I   | Display tare message |
| 8I   | Move tare register to display: Go to 37I |
| 9I   | Clear tare & tare message: Go to 37I |
| 10I  | Display tare message: Go to 23I |
| 11I  | Initiate Item mode |
| 12I  | Item previously on: Yes - go to 13I, No - go to 14I |
| 13I  | Clear item message, restore CRT message: Go to 37I |
| 14I  | Display item message, clear price/lb & wt: Go to 23I |
| 15I  | Initiate count |
| 16I  | Count previously on: Yes - go to 17I, No - go to 18I |
| 17I  | Clear count flag & messages; restore CRT messages: Go to 37I |
| 18I  | Item flag on: Yes - go to 19I, no - go to 37I |
| 19I  | Clear item flag, set count flag: Go to 23I |
| 20I  | Initiate price mode |
| 21I  | Item or count mode?: Yes - go to 33I No - go to 23I |
| 22I  | Initiate cursor, date, oper. code, commod, grade |
| 23I  | Move cursor to appropriate position, clear data areas if needed, display, initial message if needed: Go to 37I |
| 24I  | Initiate comm. index |
| 25I  | Clear CRT & initiate to display 64 - character lines |
| 26I  | Go to 1J (move commodities to CRT) |
| 27I  | Point cursor to present comm. number |
| 28I  | Set button mode to 9: Go to 37I |
| 29I  | Initiate repeat mode |
| 30I  | Repeat previously on?: Yes go to 31I, No - go to 32I |
| 31I  | Clear repeat message: Go to 37I |
| 32I  | Display repeat message: Go to 37I |
| 33I  | Initiate Grade Index |
| 34I  | Move index to CRT; Set cursor to present grade |
| 35I  | Set button mode to 10 |
| 36I  | Go to 37I |

SYSTEM FLOWCHART

| | |
|---|---|
| 37I | Go to 11E |
| 1J | Start move initial commodities to CRT |
| 2J | Point to start of present page |
| 3J | Start display commodity page |
| 4J | Point to top left of screen |
| 5J | Move commodity number to screen buffer |
| 6J | Start look up commodity description |
| 7J | Get commodity number, use as a pointer to find commodity address |
| 8J | Get character of commodity description, if space ignore and get another character |
| 9J | Character a CRLF: Yes - go to 10J, No - go to 11J |
| 10J | Number of CRLFs=2?: Yes - go to 14J - No - go to 12J |
| 11J | Move character to buffer |
| 12J | Increment line buffer pointer |
| 13J | End of line buffer: Yes - go to 14J, No - go to 8J |
| 14J | Start heading subroutine |
| 15J | Commodity equal to or greater than table entry: Yes - go to 16G, No - go to 17J |
| 16J | Set heading flag, increment table pointer: Go to 15J |
| 17J | Heading flag on: Yes - go to 18J, No - go to 19J |
| 18J | Move heading to CRT |
| 19J | Move line buffer to CRT, increment comm. number, increment screen pointer. |
| 20J | End of screen: Yes - go to 21J, No - go to 5J |
| 21J | Go to 27I or 33K dependent on calling location |
| 1K | Start service button |
| 2K | Go to 3K, 13K, 17K, 21K dependent on service mode |
| 3K | Start service cursor mode |
| 4K | Move cursor?: Yes - go to 11K, No - go to 5K |
| 5K | Alpha change?: Yes - go to 10K, No - go to 6K |
| 6K | 'less than' key?: Yes - go to 9K, No - go to 7K |
| 7K | Alpha back?: Yes - go to 8K, No - go to 34K |
| 8K | Decrement area where cursor is: If overflow set to new value: Go to 12K |
| 9K | Decrement cursor: Go to 12K |
| 10K | Increment display area where cursor is: if overflow set to new value: Go to 12K |
| 11K | Increment cursor: Go to 12K |
| 12K | Set CRT Foreground pointer: Go to 34K |
| 13K | Start service grade index |
| 14K | Alpha forward - move cursor up one line, Alpha reverse - move cursor down one line: Go to 34K |
| 15K | Grade Index?: Yes - Go to 16K, No - go to 34K |
| 16K | Move grade line to CRT buffer, cursor home, clear button mode: Go to 34K |
| 17K | Start service tare, comm. number, PPW, operator, date, grade, code, count, item |
| 18K | Numeral?: Yes - go to 19K, No - go to 34K |
| 19K | Rotate field of digits left one place |
| 20K | Move button data to CRT: Go to 34K |
| 21K | Start service comm. index mode |
| 22K | Alpha reverse?: Yes - go to 31K, No - go to 23K |
| 23K | Alpha forward?: Yes - go to 27K, No - go to 24K |
| 24K | Commodity index?: Yes go to 25K, No - go to 34K |
| 25K | Move commodity corresponding to cursor to CRT, |
| 26K | Move Tare, price, and grade corresponding to comm. number to CRT: Go to 34K |
| 27K | Cursor at first line?: Yes - go to 28K, No - go to 30K. |
| 28K | Point to previous page |
| 29K | Go to 3J |
| 30K | Move cursor up one line: Go to 34K |
| 31K | Cursor at last line?: Yes - go to 32K, No - go to 33K |
| 32K | Go to 3J |
| 33K | Move cursor down one line |
| 34K | Go to 14E |
| 1L | Start end service button modes |
| 2L | Go to 3L or 12L dependent on mode |
| 3L | Start end service for commodity number mode |
| 4L | Look up commodity address from table |
| 5L | Zero?: Yes go to 6L, No - go to 7L |
| 6L | Look up commodity address from secondary table |
| 7L. | Set pointer to start of CRT commodity area |
| 8L | Clear CRT commodity area |
| 9L | Commodity number=0? Yes - go to 16L, No - go to 10L |
| 10L | Copy commodity from Rom to CRT |
| 11L | Get price, grade, tare corresponding to commodity number: Go to 16L |
| 12L | Start end grade |
| 13L | Move grade to CRT buffer |
| 14L | Go to 16L |
| 15L | Start end service for cursor, oper. date, price, code, item, count, or tare |
| 16L | Move cursor home |
| 17L | Go to 17E |
| 1M | Start update scale |
| 2M | Data valid flag on?: Yes - go to 3M, No - go to 5M |
| 3M | Move scale data & status from temporary buffer to working area. |
| 4M | Move to display area |
| 5M | Increment fail - safe-timer |
| 6M | Overflow?: Yes - go to 7M, No - go to 8M |
| 7M | Display error |
| 8M | Go to 1N |
| 1N | Start service item, repeat, verify, count zero track modes |
| 2N | Valid date? Yes - go to 3N, No, go to 17N |
| 3N | Clear valid data flag |
| 4N | Go to 1P |
| 5N | Item, repeat or count; yes - go to 9N, No go to 6N |
| 6N | Calculate Net weight from gross weight & tare move to display. |
| 7N | Scale stable, non-zero, positive, & not overrange?: Yes - go to 8N, No - go to 15N |
| 8N | Get PPW from display, multiply weight by price per weight & move to display: Go to 10N |
| 9N | Scale stable, non zero, positive, & not overrange?: Yes - go to 10N, No - go to 16N |
| 10N | Went unstable flag on?: Yes go to 11N, No - go to 17N |
| 11N | Clear went unstable flag |
| 12N | Ready to print flag on: Yes - go to 13N, No - go to 17N |
| 13N | Sent data to printer |
| 14N | Set ready to print flag: Go to 17N |
| 15N | Blank amount display |
| 16N | Set went unstable flag |
| 17N | Go to 1R |
| 1P | Start service zero track mode |
| 2P | Zero track mode?: Yes go to 3P, No - go to 9P |
| 3P | Display zero track message |
| 4P | Compare track weight to gross weight |
| 5P | Difference greater than .004 lb?: Yes - go to 10P, No - go to 6P |
| 6P | Turn on zero span LED, Move gross weight to track weight |
| 7P | Track weight greater than .99 lb: Yes - go to 8D, No - go to 11P |
| 8P | Display error: Go to 11P |
| 9P | Turn on zero span LED if at zero else turn off Clear zero track mode: Go to 11P |
| 10P | Turn off zero span led |
| 11P | Go to 5N |
| 1R | Start refresh CRT |
| 2R | Attempt scale communication |
| 3R | Button mode 9 or 10?: Yes - go to 13R, No - go to 4R |
| 4R | Attempt scale communication |
| 5R | Vertical retrace?: Yes - go to 4R, No - go to 6R |
| 6R | Attempt scale communication |
| 7R | Vertical retrace?: Yes - go to 8R, No - go to 6R |
| 8R | CRT foreground pointer active?: Yes - go to 10R - no - go to 9R |
| 9R | Increment background pointer: Go to 11R |
| 10R | Use foreground pointer as CRT pointer & clear |
| 11R | Move 64 characters from display buffer to display |
| 12R | Attempt scale communication |
| 13R | Go to 1A |

| 0000 | 3E | 8E | D3 | 7D | 3E | FA | D3 | 7D | D3 | 7D | 3E | 37 | D3 | 7D | 3E | 05 |
|---|---|---|---|---|---|---|---|---|---|---|---|---|---|---|---|---|
| 0010 | D3 | 78 | 3E | 02 | D3 | 78 | 3E | F7 | D3 | 7E | DB | 7E | E6 | 01 | CA | 3D |
| 0020 | F0 | C3 | FF | D4 | 49 | 4E | 44 | 45 | 58 | 20 | 20 | 20 | 20 | 20 | 20 | 20 |
| 0030 | 20 | 20 | 20 | 20 | 20 | 20 | 20 | 20 | 20 | 20 | 20 | 20 | 20 | 20 | 20 | 20 |
| 0040 | 20 | 20 | 20 | 20 | 20 | 20 | 20 | 20 | 20 | 53 | 41 | 4E | 49 | 54 | 41 | 52 |

| | | | | | | | | | | | | | | | |
|---|---|---|---|---|---|---|---|---|---|---|---|---|---|---|---|
| 0050 | 59 | 20 | 53 | 43 | 41 | 4C | 45 | 20 | 43 | 4F | 4D | 50 | 41 | 4E | 59 | 20 |
| 0060 | 20 | 20 | 20 | 20 | 20 | 20 | 20 | 20 | 20 | 20 | 20 | 42 | 45 | 4C | 56 | 49 |
| 0070 | 44 | 45 | 52 | 45 | 2C | 49 | 4C | 4C | 49 | 4E | 4F | 49 | 53 | 20 | 20 | 20 |
| 0080 | 20 | 20 | 20 | 20 | 20 | 20 | 20 | 20 | 20 | 20 | 20 | 20 | 20 | 54 | 52 | 33 |
| 0090 | 20 | 55 | 50 | 43 | 20 | 53 | 59 | 53 | 54 | 45 | 4D | 20 | 20 | 20 | 20 | 20 |
| 00A0 | 20 | 20 | 20 | 20 | 20 | 20 | 20 | 20 | 20 | 20 | 20 | 20 | 20 | 20 | 20 | 20 |
| 00B0 | 20 | 20 | 20 | 20 | 20 | 20 | 20 | 20 | 20 | 20 | 20 | 20 | 20 | 20 | 20 | 20 |
| 00C0 | 20 | 20 | 20 | 20 | 47 | 52 | 41 | 44 | 45 | 20 | 20 | 20 | 20 | 20 | 20 | 20 |
| 00D0 | 20 | 20 | 20 | 20 | 20 | 20 | 20 | 20 | 20 | 20 | 20 | 20 | 20 | 20 | 20 | 20 |
| 00E0 | 20 | 20 | 20 | 20 | 20 | 20 | 20 | 20 | 20 | 20 | 20 | 20 | 20 | 20 | 20 | 20 |
| 00F0 | 20 | 20 | 20 | 20 | 20 | 20 | 20 | 20 | 20 | 20 | 20 | 20 | 20 | 20 | 20 | 20 |
| 0100 | 20 | 20 | 20 | 20 | 20 | 20 | 20 | 20 | 20 | 20 | 20 | 20 | 20 | 20 | 20 | 20 |
| 0110 | 20 | 20 | 20 | 20 | 20 | 20 | 20 | 20 | 20 | 20 | 20 | 20 | 20 | 20 | 20 | 20 |
| 0120 | 20 | 20 | 20 | 20 | 20 | 20 | 20 | 20 | 20 | 20 | 20 | 20 | 20 | 20 | 20 | 20 |
| 0130 | 20 | 20 | 20 | 20 | 20 | 20 | 20 | 20 | 20 | 20 | 20 | 20 | 20 | 20 | 20 | 20 |
| 0140 | 20 | 20 | 20 | 20 | 20 | 20 | 2E | 20 | 20 | 20 | 4C | 42 | 53 | 20 | 20 | 20 |
| 0150 | 20 | 20 | 20 | 20 | 20 | 20 | 20 | 20 | 20 | 20 | 20 | 20 | 20 | 20 | 20 | 20 |
| 0160 | 20 | 20 | 20 | 20 | 20 | 20 | 20 | 20 | 20 | 20 | 20 | 20 | 40 | 20 | 24 | 20 |
| 0170 | 30 | 2E | 30 | 30 | 20 | 2F | 4C | 42 | 20 | 3D | 20 | 20 | 24 | 20 | 20 | 2E |
| 0180 | 20 | 20 | 20 | 20 | 2F | 20 | 20 | 20 | 20 | 20 | 20 | 20 | 20 | 20 | 6F | 20 |
| 0190 | 20 | 20 | 20 | 20 | 20 | 20 | 20 | 20 | 20 | 20 | 20 | 20 | 20 | 20 | 2D | 54 | 4F |
| 01A0 | 54 | 41 | 4C | 2D | 20 | 20 | 20 | 20 | 20 | 20 | 20 | 20 | 20 | 20 | 20 | 20 |
| 01B0 | 20 | 20 | 20 | 20 | 20 | 20 | 4D | 4F | 44 | 45 | 2D | 20 | 20 | 20 | 20 | 20 |
| 01C0 | 20 | 20 | 20 | 20 | 44 | 41 | 54 | 45 | 20 | 20 | 20 | 20 | 20 | 20 | 20 | 20 |
| 01D0 | 20 | 20 | 20 | 20 | 20 | 20 | 20 | 20 | 20 | 20 | 20 | 20 | 20 | 20 | 20 | 20 |
| 01E0 | 20 | 20 | 20 | 20 | 4F | 50 | 45 | 52 | 41 | 54 | 4F | 52 | 20 | 20 | 20 | 20 |
| 01F0 | 20 | 20 | 20 | 20 | 20 | 20 | 20 | 20 | 20 | 20 | 20 | 20 | 20 | 20 | 20 | 20 |
| 0200 | 20 | 20 | 20 | 20 | 53 | 54 | 4F | 52 | 45 | 20 | 20 | 20 | 20 | 20 | 20 | 20 |
| 0210 | 20 | 20 | 20 | 20 | 20 | 20 | 20 | 20 | 20 | 20 | 20 | 20 | 20 | 20 | 20 | 20 |
| 0220 | 20 | 20 | 20 | 20 | 3E | 00 | 21 | 20 | EA | 77 | 2C | 20 | FC | C9 | 21 | 24 |
| 0230 | D0 | 11 | 00 | E8 | 01 | 00 | 02 | ED | B0 | CD | 4E | D2 | C9 | 3E | 05 | D3 |
| 0240 | 78 | 3E | 01 | D3 | 78 | 3E | 00 | 32 | 22 | EA | 32 | 61 | EA | C9 | 21 | 21 |
| 0250 | EA | 7E | F6 | 20 | 77 | D3 | 7E | C9 | 21 | 21 | EA | 7E | E6 | DF | 77 | D3 |
| 0260 | 7E | C9 | 3A | 28 | EA | CB | 47 | C9 | 77 | 23 | 10 | FC | C9 | 3A | 42 | EA |
| 0270 | 07 | 07 | E6 | 03 | 47 | 3A | 43 | EA | 10 | 07 | E6 | 04 | B0 | 3C | 32 | 67 |
| 0280 | EA | C9 | 2A | 42 | EA | CB | BE | C9 | 2A | 42 | EA | CB | FE | C9 | 34 | C0 |
| 0290 | 23 | 34 | 2B | C9 | 23 | 13 | 1A | BE | 2B | 1B | C0 | 1A | BE | C9 | A7 | 1A |
| 02A0 | 86 | 27 | 12 | 23 | 13 | 18 | 01 | A7 | 1A | 8E | 27 | 12 | 13 | 23 | 1A | 8E |
| 02B0 | 27 | 12 | C9 | F5 | C5 | 7E | 4F | CB | 3F | CB | 3F | CB | 3F | CB | 3F | C6 |
| 02C0 | 30 | 12 | 79 | E6 | 0F | C6 | 30 | 13 | 12 | 1B | C1 | F1 | C9 | 7E | CB | 27 |
| 02D0 | CB | 27 | CB | 27 | CB | 27 | 4F | 23 | 7E | E6 | 0F | B1 | 12 | 2B | C9 | A7 |
| 02E0 | 1A | 9E | 27 | DD | 77 | 00 | 23 | 13 | DD | 23 | 10 | F4 | C9 | 06 | 0E | 7E |
| 02F0 | 32 | 74 | EA | 23 | 7E | 32 | 75 | EA | 3E | 01 | 32 | 76 | EA | AF | 32 | 77 |
| 0300 | EA | 1F | 32 | 13 | 12 | 1B | 3A | 75 | EA | 3A | 74 | EA | 1F |
| 0310 | 32 | 74 | EA | 30 | 12 | 3A | 76 | EA | 4F | 1A | 81 | 27 | 12 | 3A | 77 | EA |
| 0320 | 4F | 13 | 1A | 89 | 27 | 12 | 1B | 3A | 76 | EA | 87 | 27 | 32 | 76 | EA | 3A |
| 0330 | 77 | EA | 8F | 27 | 32 | 77 | EA | 10 | CC | 6B | 62 | 13 | 13 | CD | B3 | D2 |
| 0340 | 1B | 1B | 23 | CD | B3 | D2 | C9 | 21 | 00 | 00 | 3A | 06 | E8 | E6 | 0F | 28 |
| 0350 | 07 | 11 | E8 | 03 | 47 | 19 | 10 | FD | 3A | 07 | E8 | E6 | 0F | 28 | 07 | 11 |
| 0360 | 64 | 00 | 47 | 19 | 10 | FD | 3A | 08 | E8 | E6 | 0F | 28 | 07 | 11 | 0A | 00 |
| 0370 | 47 | 19 | 10 | FD | 3A | 09 | E8 | E6 | 0F | 16 | 00 | 5F | 19 | C9 | 2B | 29 |
| 0380 | CD | 97 | D3 | D9 | 6F | D9 | 23 | CD | 97 | D3 | 67 | D9 | 7D | D9 | 6F | C9 |
| 0390 | CD | 97 | D3 | 23 | FE | 0D | C9 | 3E | 00 | D3 | C3 | CD | AB | D3 | 3E | 0A |
| 03A0 | D3 | C3 | DB | C0 | F5 | 3E | 00 | D3 | C3 | F1 | C9 | F5 | 7C | 07 | E6 | F0 |
| 03B0 | D5 | 57 | 7C | E6 | 07 | B2 | D1 | D3 | C1 | 7D | D3 | C2 | F1 | C9 | 3E | 00 |
| 03C0 | D3 | C3 | 3E | 04 | D3 | C3 | 3E | 15 | D3 | C3 | D9 | 7E | 23 | D9 | CD | E0 |
| 03D0 | D3 | 23 | 10 | F6 | 3E | 04 | D3 | C3 | 3E | FC | CD | 3E | 00 | D3 | C3 | C9 |
| 03E0 | F5 | 7C | FE | 80 | 38 | 02 | F1 | C9 | F1 | F5 | CD | AB | D3 | D3 | C0 | 3E |
| 03F0 | 17 | D3 | C3 | CD | FC | D3 | 3E | 15 | D3 | C3 | F1 | C9 | C5 | 0E | 25 | 06 |
| 0400 | 00 | 10 | FE | 0D | 20 | FB | C1 | C9 | 3E | 28 | C3 | 26 | D4 | 3E | 29 | C3 |
| 0410 | 26 | D4 | CD | 08 | D4 | 3E | 21 | CD | 26 | D4 | C9 | E6 | 0F |
| 0420 | 81 | 27 | E6 | 0F | 4F | C9 | 4F | DB | 7D | E6 | 01 | 28 | FA | 79 | D3 | 7C |
| 0430 | C9 | 06 | 03 | 3E | 20 | CD | 26 | D4 | 10 | F9 | C9 | 7E | CD | 26 | D4 | 23 |
| 0440 | 10 | F9 | C9 | 7E | CD | 4B | D4 | 23 | 10 | F9 | C9 | E6 | 0F | C6 | 30 | C3 |
| 0450 | 26 | D4 | CD | 82 | D2 | 21 | 42 | EA | CD | 8E | D2 | 7E | FE | 80 | 20 | 03 |
| 0460 | 3E | 40 | 77 | CD | 88 | D2 | C9 | 01 | 02 | 00 | 3D | 87 | 85 | 6F | 3E | 00 |
| 0470 | 8C | 67 | ED | B0 | C9 | 00 | 02 | 04 | 06 | 08 | 09 | 01 | 03 | 05 | 07 | 00 |
| 0480 | 03 | 06 | 09 | 02 | 05 | 08 | 01 | 04 | 07 | 00 | 05 | 09 | 04 | 08 | 03 | 07 |
| 0490 | 02 | 06 | 01 | 4A | 41 | 4E | 46 | 45 | 42 | 4D | 41 | 52 | 41 | 50 | 52 | 4D |
| 04A0 | 41 | 59 | 4A | 55 | 4E | 4A | 55 | 4C | 41 | 55 | 47 | 53 | 45 | 50 | 4F | 43 |
| 04B0 | 54 | 4E | 4F | 56 | 44 | 45 | 43 | 20 | 20 | 20 | 11 | 75 | D4 | 18 | 0A | 11 |
| 04C0 | 7F | D4 | 18 | 05 | 11 | 89 | D4 | 18 | 00 | 7E | E6 | 0F | 83 | 5F | 30 | 01 |
| 04D0 | 14 | 1A | C9 | 06 | 03 | 7E | CD | 1E | D4 | 23 | 10 | F8 | C9 | 0E | 00 |
| 04E0 | 7E | E6 | 0F | 28 | 02 | 0E | 0A | 23 | 7E | E6 | 0F | 81 | 3D | FE | 0C | 38 |
| 04F0 | 02 | 3E | 0C | 4F | 81 | 81 | 21 | 93 | D4 | 85 | 30 | 01 | 24 | 6F | C9 | 31 |
| 0500 | FF | EB | CD | 24 | D2 | CD | 2E | D2 | CD | 3D | D2 | CD | 43 | DE | CD | 6E |
| 0510 | D5 | CD | 04 | D6 | CD | 12 | DC | CD | 35 | DC | CD | AC | E1 | 18 | EC | DB |
| 0520 | 7D | E6 | 02 | C8 | DB | 7C | 4F | FE | 02 | 20 | 0B | 3E | 01 | 32 | 61 | EA |
| 0530 | 3E | 00 | 32 | 22 | EA | C9 | 3A | 61 | EA | B7 | C8 | E6 | 07 | C6 | 59 | 6F |
| 0540 | 26 | EA | 79 | 77 | 21 | 62 | EA | 86 | 77 | 21 | 61 | EA | 7E | E6 | 07 | 3C |
| 0550 | 77 | FE | 08 | C0 | 3E | 00 | 77 | 21 | 5A | EA | 11 | 23 | EA | 01 | 07 | 00 |
| 0560 | ED | B0 | 3E | FF | 32 | 22 | EA | 21 | 00 | FD | 22 | 49 | EA | C9 | 3E | 00 |

-continued

| | | | | | | | | | | | | | | | |
|---|---|---|---|---|---|---|---|---|---|---|---|---|---|---|---|
| 0570 | 32 | 2F | EA | CD | BB | D5 | 38 | 06 | 3E | 00 | 32 | 30 | EA | C9 | 3A | 30 |
| 0580 | EA | B7 | 20 | 15 | 3E | FF | 32 | 30 | EA | 3E | F0 | 32 | 32 | EA | 3E | FA |
| 0590 | 32 | 31 | EA | 3E | FF | 32 | 2F | EA | C9 | 21 | 2E | EA | 7E | FE | 0E | 28 |
| 05A0 | 0B | FE | 0D | 28 | 07 | FE | 0C | 28 | 03 | FE | 0A | C0 | 21 | 32 | EA | 34 |
| 05B0 | C0 | 3E | FF | 77 | 21 | 31 | EA | 34 | C0 | 18 | D3 | 06 | 04 | 1E | F7 | 21 |
| 05C0 | 21 | EA | 7E | F6 | 0F | A3 | 77 | D3 | 7E | DB | 7E | 2F | E6 | 0F | 20 | 07 |
| 05D0 | CB | 0B | 10 | EE | 37 | 3F | C9 | 1E | FF | 1C | CB | 0F | 30 | FB | 7B | 05 |
| 05E0 | CB | 20 | CB | 20 | 80 | 21 | F4 | D5 | 85 | 6F | 3E | 00 | 8C | 67 | 7E | 32 |
| 05F0 | 2E | EA | 37 | C9 | 04 | 05 | 06 | 07 | 0C | 0D | 0E | 0F | 08 | 09 | 0A | 0B |
| 0600 | 00 | 01 | 02 | 03 | 2A | 42 | EA | 7C | FE | E8 | 20 | 32 | 7D | FE | 20 | 20 |
| 0610 | 2D | 21 | 78 | EA | DB | 7E | CB | 6F | 28 | 04 | 36 | 00 | 18 | 20 | 7E | B7 |
| 0620 | 20 | 1C | 36 | FF | 3A | 21 | EA | F6 | 40 | D3 | 7E | 32 | 21 | EA | CD | F5 |
| 0630 | E5 | CD | 74 | E6 | 3A | 21 | EA | E6 | BF | D3 | 7E | 32 | 21 | EA | 3A | 33 |
| 0640 | EA | B7 | 28 | 2F | 3A | 2F | EA | B7 | 20 | 0F | 21 | 34 | EA | 34 | C0 | 21 |
| 0650 | F2 | DB | 3A | 33 | EA | 3D | C3 | 81 | D6 | 3A | 33 | EA | FE | 06 | 28 | 04 |
| 0660 | 3E | A0 | 18 | 02 | 3E | 00 | 32 | 34 | EA | 3A | 33 | EA | 3D | 21 | 38 | DB |
| 0670 | C3 | 81 | D6 | 3A | 2F | EA | B7 | C8 | 3A | 2E | EA | 21 | 14 | D9 | C3 | 81 |
| 0680 | D6 | E6 | 0F | 87 | 85 | 6F | 3E | 00 | 8C | 67 | 7E | 23 | 66 | 6F | EA | 3A |
| 0690 | 35 | EA | B7 | 20 | 06 | 3A | 36 | EA | B7 | 28 | 1A | 21 | E0 | E8 | 3E | 20 |
| 06A0 | 06 | 11 | CD | 68 | D2 | 3E | 00 | 21 | 35 | EA | 06 | 03 | CD | 68 | D2 | 3E |
| 06B0 | FF | 32 | 22 | EA | C9 | 3A | 4E | EA | B7 | 20 | 11 | 3A | 4F | EA | B7 | 20 |
| 06C0 | 0B | CD | FD | D6 | 3E | 20 | 32 | E9 | E8 | C3 | A4 | D8 | 3A | 4F | EA | B7 |
| 06D0 | C0 | 3A | 66 | EA | B7 | C0 | CD | FD | D6 | 21 | 63 | EA | 11 | 35 | EA | 01 |
| 06E0 | 03 | 00 | ED | B0 | 21 | 36 | EA | 11 | E7 | E8 | CD | B3 | D2 | 2B | 11 | E9 |
| 06F0 | E8 | CD | B3 | D2 | 3E | 20 | 32 | EA | E8 | CD | AF | D6 | C9 | 21 | 8C | D9 |
| 0700 | 11 | E0 | E8 | 01 | 11 | 00 | ED | B0 | C9 | 3A | 38 | EA | B7 | 20 | 13 | 2F |
| 0710 | 32 | 38 | EA | B7 | 28 | 0F | 21 | 30 | D7 | 11 | D2 | E9 | 01 | 06 | 00 | ED |
| 0720 | B0 | C9 | AF | 18 | EB | 3E | 20 | 21 | D2 | E9 | 06 | 06 | CD | 68 | D2 | C9 |
| 0730 | 52 | 45 | 50 | 45 | 41 | 54 | 3E | FF | 32 | 2C | EA | C9 | C9 | 3A | 3D | EA |
| 0740 | B7 | C0 | 3A | 41 | EA | B7 | 20 | 26 | 2F | 32 | 41 | EA | B7 | 20 | 0E | 3E |
| 0750 | 20 | 21 | F2 | E9 | 06 | 0E | CD | 68 | D2 | CD | CB | D7 | C9 | 21 | 71 | D7 |
| 0760 | 11 | F2 | E9 | 01 | 0E | 00 | ED | B0 | CD | C1 | D7 | C3 | A4 | D8 | AF | 18 |
| 0770 | D8 | 50 | 52 | 49 | 43 | 45 | 20 | 42 | 59 | 20 | 49 | 54 | 45 | 4D | 20 | 3A |
| 0780 | 3D | EA | B7 | 20 | 2A | 3A | 41 | EA | B7 | C8 | AF | 32 | 41 | EA | 3E | FF |
| 0790 | 32 | 3D | EA | 21 | D7 | 11 | FB | E9 | 01 | 05 | 00 | ED | B0 | CD | C1 |
| 07A0 | D7 | 21 | DC | D7 | 11 | 52 | E9 | 01 | 03 | 00 | ED | B0 | C3 | A4 | D8 | AF |
| 07B0 | 32 | 3D | EA | 21 | F2 | E9 | 3E | 20 | 06 | 0E | CD | 68 | D2 | CD | CB | D7 |
| 07C0 | C9 | 3E | 20 | 21 | 20 | E9 | 06 | 36 | C3 | 68 | D2 | 21 | 44 | D1 | 11 | 20 |
| 07D0 | E9 | 01 | 40 | 00 | ED | B0 | C9 | 43 | 4F | 55 | 4E | 54 | 46 | 4F | 52 | 3E |
| 07E0 | 09 | 32 | 33 | EA | CD | 14 | E2 | CD | 58 | D2 | CD | 47 | D3 | 7D | 0F | 0F |
| 07F0 | 6F | E6 | C0 | C6 | 04 | 5F | 7D | E6 | 03 | C6 | F8 | 57 | D5 | CD | 01 | E2 |
| 0800 | D1 | EB | 22 | 89 | EA | CD | 5B | E3 | C9 | 21 | 00 | 0C | 22 | 74 | EA | 21 |
| 0810 | 00 | F8 | 22 | 55 | EA | 3E | 10 | 32 | 57 | EA | 06 | 20 | 2A | 74 | EA | 11 |
| 0820 | 00 | EB | CD | 97 | D3 | 12 | 23 | 13 | 10 | F8 | 22 | 74 | EA | CD | 01 | E2 |
| 0830 | 21 | 00 | EB | ED | 5B | 55 | EA | 01 | 20 | 00 | ED | B0 | 21 | 20 | 00 | 19 |
| 0840 | 22 | 55 | EA | 3A | 57 | EA | 3D | 32 | 57 | EA | 20 | CE | 3A | A7 | E8 | FE |
| 0850 | 30 | 20 | 09 | 3E | FA | 67 | 3E | 48 | 6F | C3 | 8B | D8 | 3D | E6 | 03 | 0F |
| 0860 | 0F | C6 | 08 | 6F | 3A | A7 | E8 | E6 | 0C | 0F | C6 | F8 | 67 | 3A |
| 0870 | A6 | E8 | E6 | 0F | B7 | 28 | 14 | 3E | 80 | 85 | 6F | 3E | 02 | 8C | 67 | 3A |
| 0880 | A7 | E8 | E6 | 0F | C6 | 79 | 30 | 03 | 21 | 48 | FA | 22 | 42 | EA | CD | 88 |
| 0890 | D2 | 3E | 0A | 32 | 33 | EA | C9 | 3A | 41 | EA | B7 | C0 | 3A | 3D | EA | B7 |
| 08A0 | C0 | C3 | A4 | D8 | 21 | 34 | D9 | 3A | 2E | EA | 85 | 6F | 3E | 00 | 8C | 67 |
| 08B0 | 7E | 32 | 33 | EA | CD | 82 | D2 | 21 | 74 | D9 | 11 | 42 | EA | CD | 67 | D4 |
| 08C0 | CD | 6D | D2 | 3A | 33 | EA | 11 | 46 | EA | 21 | 5C | D9 | CD | 67 | D4 | 3A |
| 08D0 | 33 | EA | 11 | 44 | EA | 21 | 44 | D9 | CD | 67 | D4 | 3A | 33 | EA | FE | 01 |
| 08E0 | 28 | 1C | FE | 03 | 28 | 1C | FE | 06 | 28 | 14 | 2A | 44 | EA | 36 | 20 | 23 |
| 08F0 | 3A | 46 | EA | BD | 20 | 01 | 23 | 3A | 42 | EA | 3C | BD | 20 | EF | CD | 88 |
| 0900 | D2 | C9 | 21 | 0F | D9 | 11 | 4B | E9 | 01 | 05 | 00 | ED | B0 | 18 | EF | 20 |
| 0910 | 30 | 2E | 30 | 30 | 8F | D6 | A4 | D8 | A4 | D8 | A4 | D8 | 3D | D7 | 7F | D7 |
| 0920 | 09 | D7 | A4 | D8 | A4 | D8 | 97 | D8 | 3C | D7 | 09 | D8 | A4 | D8 | 3C | D7 |
| 0930 | 3C | D7 | DF | D7 | 01 | 04 | 05 | 08 | 0B | 0C | 00 | 02 | 07 | 03 | 00 | 0A |
| 0940 | 06 | 00 | 00 | 09 | E7 | E8 | 06 | E8 | 4B | E9 | A5 | E9 | CB | E9 | 00 | 00 |
| 0950 | A6 | E8 | EA | E9 | 00 | 00 | 00 | 00 | 59 | E9 | 4E | E9 | 00 | 00 | 00 | 00 |
| 0960 | 4D | E9 | A7 | E9 | 00 | 00 | 00 | 00 | 00 | 00 | 00 | 00 | 00 | 00 | 00 | 00 |
| 0970 | 5B | E9 | 00 | 00 | E8 | E8 | 09 | E8 | 4F | E9 | AC | E9 | CC | E9 | 40 | E8 |
| 0980 | A7 | E8 | EC | E9 | 00 | 00 | 00 | 00 | 5D | E9 | 4F | E9 | 54 | 41 | 52 | 45 |
| 0990 | 20 | 30 | 2E | 30 | 30 | 30 | 20 | 4C | 42 | 53 | 28 | 2D | 29 | 3A | 2E | EA |
| 09A0 | FE | 0A | D0 | CD | 82 | D2 | CD | B9 | D9 | 3A | EA | C6 | 30 | 2A | 42 |
| 09B0 | EA | 77 | CD | 88 | D2 | CD | 6D | D2 | C9 | ED | 4B | 44 | EA | 03 | ED | 43 |
| 09C0 | 55 | EA | 0B | 21 | 55 | EA | 11 | 46 | EA | CD | 94 | D2 | 28 | 0E | 3A | 55 |
| 09D0 | EA | FE | AA | 20 | 0E | 3A | 56 | EA | FE | E9 | 20 | 07 | 2A | 55 | EA | 23 |
| 09E0 | 22 | 55 | EA | ED | 5B | 55 | EA | 1A | 02 | 21 | 55 | EA | 11 | 42 | EA | CD |
| 09F0 | 94 | D2 | 28 | 06 | ED | 4B | 55 | EA | 18 | C3 | 3A | 33 | EA | FE | 03 | 28 |
| 0A00 | 03 | FE | 0B | C0 | 2A | 44 | EA | 7E | FE | 30 | C0 | 3E | 20 | 77 | C9 | 3A |
| 0A10 | 2E | EA | FE | 0C | 20 | 05 | CD | 52 | D4 | 18 | 2B | FE | 0E | 20 | 0D | 2A |
| 0A20 | 42 | EA | 7E | 3C | FE | DB | 20 | 16 | 3E | A0 | 18 | 12 | 28 | 13 |
| 0A30 | FE | 0A | C0 | 2A | 42 | EA | 7E | 3D | FE | 9F | 20 | 02 | 3E | DA | 77 | CD |
| 0A40 | 6D | D2 | C9 | CD | 4A | DA | CD | 6D | D2 | C9 | 82 | D2 | 2A | 42 | EA |
| 0A50 | 2B | 22 | 42 | EA | 7D | FE | 3F | 20 | 05 | 3E | 7F | 32 | 42 | EA | CD | 88 |
| 0A60 | D2 | C9 | 3A | 2E | EA | FE | 0A | 20 | 14 | 11 | 40 | 00 | 2A | 89 | EA | 7D |
| 0A70 | FE | C4 | 20 | 21 | 7C | FE | FB | 20 | 1C | CD | 86 | E3 | C9 | FE | 0E | 20 |
| 0A80 | 24 | 11 | C0 | FF | 2A | 89 | EA | 7D | FE | 04 | 20 | 09 | 7C | FE | F8 | 20 |

-continued

| | | | | | | | | | | | | | |
|---|---|---|---|---|---|---|---|---|---|---|---|---|---|
| 0A90 | 04 | CD | 69 | E3 | C9 | E5 | D5 | CD | 01 | E2 | D1 | E1 | 36 | 20 | 19 | 22 |
| 0AA0 | 89 | EA | 36 | BE | C9 | FE | 0F | C0 | 2A | 89 | EA | 7D | 07 | 07 | E6 | 03 |
| 0AB0 | 5F | 7C | 07 | 07 | E6 | 0C | B3 | 5F | 16 | 00 | 2A | 72 | EA | 19 | 11 | F0 |
| 0AC0 | FF | 19 | 22 | 74 | EA | 21 | 74 | EA | 11 | 06 | E8 | CD | ED | D2 | CD | 8B |
| 0AD0 | E2 | CD | 14 | E2 | CD | 4E | D2 | 3E | 00 | 32 | 33 | EA | C9 | CD | 01 | E2 |
| 0AE0 | 3A | 2E | EA | FE | 0E | 20 | 1B | CD | 82 | D2 | 2A | 42 | EA | 7C | FE | F8 |
| 0AF0 | 20 | 05 | 7D | FE | 08 | 28 | 07 | 11 | C0 | FF | 19 | 22 | 42 | EA | CD | 88 |
| 0B00 | D2 | C9 | FE | 0A | 20 | 19 | CD | 82 | D2 | 2A | 42 | EA | 7C | FE | FB | 20 |
| 0B10 | 05 | 7D | FE | C8 | 28 | E8 | 11 | 40 | 00 | 19 | 22 | 42 | EA | 18 | DF | FE |
| 0B20 | 0B | C0 | CD | 82 | D2 | 2A | 42 | EA | 2D | 2D | 11 | A6 | E8 | 01 | 1A | 00 |
| 0B30 | ED | B0 | C3 | E3 | DB | C3 | 35 | DB | 9D | D9 | 9D | 9D | 9D | 9D | 9D | D9 |
| 0B40 | 9D | D9 | 0F | DA | 9D | D9 | 9D | D9 | 62 | DA | DD | DA | 9D | D9 | 9D | D9 |
| 0B50 | 35 | DB | 35 | DB | 35 | DB | 35 | DB | CD | A5 | D6 | 21 | E7 | E8 | 11 | 36 |
| 0B60 | EA | CD | CD | D2 | CD | AF | D6 | 3A | 36 | EA | B7 | CC | 9B | D6 | C3 | E0 |
| 0B70 | DB | CD | 8B | E2 | C3 | E0 | DB | C9 | C3 | 78 | DB | 3A | A7 | E8 | E6 | 0F |
| 0B80 | B7 | 20 | 20 | 3A | A6 | E8 | E6 | 0F | B7 | 20 | 0D | 3E | 20 | 06 | 0F | 21 |
| 0B90 | B1 | E8 | CD | 68 | D2 | C3 | E0 | DB | 21 | 31 | 0D | 06 | 0F | 11 | B1 | E8 |
| 0BA0 | C3 | D5 | DB | 3A | A7 | E8 | 3D | 0F | 0F | 4F | E6 | E0 | C6 | 11 | 6F |
| 0BB0 | 79 | E6 | 01 | C6 | 0C | 67 | 06 | 0F | 11 | B1 | E8 | 3A | A6 | E8 | E6 | 0F |
| 0BC0 | B7 | 28 | 12 | 3E | 40 | 85 | 6F | 3E | 01 | 8C | 67 | 3A | A7 | E8 | C6 | 49 |
| 0BD0 | 30 | 03 | 21 | 31 | 0D | CD | 97 | D3 | 12 | 23 | 13 | 10 | F8 | C3 | E0 | DB |
| 0BE0 | CD | 82 | D2 | 21 | 20 | E8 | 22 | 42 | EA | CD | 88 | D2 | 3E | 00 | 32 | 33 |
| 0BF0 | EA | C9 | 58 | DB | 71 | DB | E0 | DB | E0 | DB | E0 | DB | E0 | DB | 7B | DB |
| 0C00 | E0 | DB | 77 | DB | 77 | DB | E0 | DB | E0 | DB | 78 | DB | 78 | DB | 78 | DB |
| 0C10 | 78 | DB | 3A | 22 | EA | B7 | 28 | 10 | 21 | 23 | EA | 11 | 40 | EA | 06 | 03 |
| 0C20 | CD | CD | D2 | 23 | 1B | 10 | F8 | 2A | 49 | EA | 2C | 20 | 03 | 23 | 3E |
| 0C30 | 01 | 22 | 49 | EA | C9 | 3A | 22 | EA | B7 | C8 | 3E | 00 | 32 | 22 | EA | CD |
| 0C40 | 20 | E1 | 3A | 41 | EA | B7 | C2 | 22 | DE | 3A | 38 | EA | B7 | C2 | 22 | DE |
| 0C50 | 3A | 3D | EA | B7 | C2 | 22 | DE | 11 | 3E | EA | 21 | 3A | EA | DD | 21 | 63 |
| 0C60 | EA | 06 | 03 | CD | DF | D2 | 11 | 63 | EA | 21 | 35 | EA | DD | 21 | 4D | EA |
| 0C70 | 06 | 03 | CD | DF | D2 | 3E | 00 | 32 | 66 | EA | 3A | 4F | EA | E6 | F0 | FE |
| 0C80 | 90 | 20 | 1E | 3E | 00 | 11 | 55 | EA | 12 | 13 | 12 | 13 | 12 | 11 | 55 | EA |
| 0C90 | 21 | 4D | EA | DD | 21 | 4D | EA | 06 | 03 | CD | DF | D2 | 3E | FF | 32 | 66 |
| 0CA0 | EA | 21 | 55 | EA | 36 | 50 | 23 | 36 | 00 | 23 | 36 | 00 | 11 | 4D | EA | 21 |
| 0CB0 | 55 | EA | CD | 9E | D2 | 21 | 4E | EA | 11 | 23 | E9 | CD | B3 | D2 | 23 | 11 |
| 0CC0 | 20 | E9 | CD | B3 | D2 | 3A | 66 | EA | B7 | 28 | 11 | 3A | 4E | EA | B7 | 20 |
| 0CD0 | 06 | 3A | 4F | EA | B7 | 28 | 05 | 3E | 2D | 32 | 20 | E9 | 3E | 2E | 32 | 22 |
| 0CE0 | E9 | 3A | 20 | E9 | FE | 30 | 20 | 05 | 3E | 20 | 32 | 20 | E9 | 21 | 35 | EA |
| 0CF0 | 7E | B7 | 20 | 1B | 23 | 7E | B7 | 20 | 16 | 3E | 20 | 21 | F4 | E8 | 06 | 0C |
| 0D00 | CD | 68 | D2 | 3A | 21 | EA | E6 | 7F | 32 | 21 | EA | D3 | 7E | 18 | 23 | 21 |
| 0D10 | 26 | DD | 11 | F4 | E8 | 01 | 0C | 00 | ED | B0 | 3A | 21 | EA | F6 | 80 | 32 |
| 0D20 | 21 | EA | D3 | 7E | 18 | 0C | 4E | 45 | 54 | 20 | 57 | 54 | 20 | 53 | 48 | 4F |
| 0D30 | 57 | 4E | CD | 29 | DE | CA | 0A | DE | 21 | 4E | E9 | 11 | 4C | EA | CD | CD |
| 0D40 | D2 | 21 | 4E | E9 | 11 | 4B | EA | CD | CD | D2 | 3E | 00 | 21 | 50 | EA | 06 |
| 0D50 | 05 | CD | 68 | D2 | 3A | 4B | EA | E6 | 0F | 28 | 0C | 47 | 21 | 4E | EA | 11 |
| 0D60 | 50 | EA | CD | A7 | D2 | 10 | F5 | 21 | 4E | EA | 11 | 55 | EA | 01 | 02 | 00 |
| 0D70 | ED | B0 | 21 | 55 | EA | AF | ED | 6F | 23 | ED | 6F | 23 | ED | 6F | 7E | E6 |
| 0D80 | 0F | 77 | 3A | 4B | EA | CB | 3F | CB | 3F | CB | 3F | CB | 3F | B7 | 28 | 0C |
| 0D90 | 47 | 21 | 55 | EA | 11 | 50 | EA | CD | 9E | D2 | 10 | F5 | 3A | 4C | EA | E6 |
| 0DA0 | 0F | 28 | 0C | 47 | 21 | 4E | EA | 11 | 51 | EA | CD | A7 | D2 | 10 | F5 | 3A |
| 0DB0 | 4C | EA | CB | 3F | CB | 3F | CB | 3F | CB | 3F | B7 | 28 | 0C | 47 | 21 | 55 |
| 0DC0 | EA | 11 | 51 | EA | CD | 9E | D2 | 10 | F5 | 3A | 54 | EA | B7 | 3E | 05 | 3A |
| 0DD0 | 53 | EA | B7 | 3E | 05 | 21 | 51 | EA | 11 | 5C | E9 | CD | B3 | D2 | 21 | 52 |
| 0DE0 | EA | 11 | 59 | E9 | CD | B3 | D2 | 3A | 59 | E9 | FE | 30 | 20 | 05 | 3E | 20 |
| 0DF0 | 32 | 59 | E9 | 3A | 8C | EA | B7 | C8 | AF | 32 | 8C | EA | 3A | 88 | EA | B7 |
| 0E00 | C0 | CD | B3 | DE | 3E | FF | 32 | 88 | EA | C9 | 3E | 20 | 21 | 59 | E9 | 06 |
| 0E10 | 02 | CD | 68 | D2 | 21 | 5C | E9 | 06 | 02 | CD | 68 | D2 | 3E | FF | 32 | 8C |
| 0E20 | EA | C9 | CD | 29 | DE | 28 | F5 | 18 | CA | 3A | 28 | EA | CB | 47 | C8 | CB |
| 0E30 | 57 | C8 | 3A | 4E | EA | B7 | 20 | 05 | 3A | 4F | EA | B7 | C8 | 3A | 66 | EA |
| 0E40 | 2F | B7 | C9 | DB | 7E | CB | 77 | 20 | 1A | CD | 29 | DE | 28 | 15 | 01 | E2 | C1 |
| 0E50 | DE | CD | B3 | DE | CD | 59 | DE | 18 | 2D | 06 | 10 | C5 | CD | 01 | E2 | C1 |
| 0E60 | 10 | F9 | C9 | DB | 7F | CB | 4F | 28 | 07 | 3E | FF | 32 | 9C | EA | 18 | DE |
| 0E70 | DB | 7E | CB | 67 | C2 | AE | DE | 3A | 2A | EA | B7 | C0 | 3E | FF | 32 | 2A |
| 0E80 | EA | 3A | 88 | EA | B7 | C8 | CD | 12 | D4 | CD | 45 | D2 | 3A | 9C | EA | B7 |
| 0E90 | 28 | 14 | 3E | 00 | 21 | 99 | EA | 06 | 02 | CD | 68 | D2 | 21 | 96 | EA | 3E |
| 0EA0 | 00 | 06 | 02 | CD | 68 | D2 | AF | 32 | 9C | EA | 32 | 88 | EA | C9 | AF | 32 |
| 0EB0 | 2A | EA | C9 | CD | 08 | D4 | CD | 16 | DF | CD | 43 | DF | CD | 26 | DF | CD |
| 0EC0 | 59 | DF | CD | 29 | E0 | CF | DE | CD | E1 | E0 | CD | 0D | D4 | C9 | D2 |
| 0ED0 | 0D | CD | 26 | D4 | 21 | 02 | DF | 3A | 9C | EA | B7 | 20 | 03 | 21 | B1 | E8 |
| 0EE0 | 06 | 0F | CD | 3B | D4 | CD | 11 | DF | 21 | CB | E9 | 06 | 02 | CD | 3B | D4 |
| 0EF0 | CD | 11 | DF | 21 | EA | E9 | 06 | 03 | CD | 3B | D4 | CD | 11 | DF | CD | CD |
| 0F00 | E0 | C9 | 20 | 20 | 20 | 20 | 54 | 4F | 4C | 20 | 20 | 20 | 20 |
| 0F10 | 20 | 3E | 20 | C3 | 26 | D4 | 3E | 3B | CD | 26 | D4 | 3E | 31 | CD | 26 | D4 |
| 0F20 | 3E | 34 | CD | 26 | D4 | C9 | 3E | 5F | CD | 26 | D4 | CD | FC | E0 | CD | 2C |
| 0F30 | E2 | 21 | 59 | E9 | 06 | 02 | CD | 43 | D4 | 23 | 06 | 02 | CD | 43 | D4 | CD |
| 0F40 | 50 | E2 | C9 | 3E | 26 | D4 | 3E | 2B | CD | 26 | D4 | 21 | 06 | E8 |
| 0F50 | 06 | 04 | CD | 3B | D4 | CD | 11 | DF | C9 | 3E | 0D | CD | 26 | D4 | 3A | 41 |
| 0F60 | EA | B7 | C2 | 06 | E0 | 3A | 3D | EA | B7 | C2 | 0C | E0 | CD | 11 | DF | 3A |
| 0F70 | 9C | EA | B7 | 28 | 32 | 3E | 30 | 06 | 04 | CD | 26 | D4 | 10 | FB | 21 | 9A |
| 0F80 | EA | 11 | 55 | EA | CD | B3 | D2 | 55 | EA | 06 | 02 | CD | 3B | D4 | 3E |
| 0F90 | 2E | CD | 26 | D4 | 21 | 99 | EA | 11 | 55 | EA | CD | B3 | D2 | 21 | 55 | EA |
| 0FA0 | 06 | 02 | CD | 3B | D4 | 18 | 11 | 21 | 4E | EA | 11 | 99 | EA | CD | 9E | D2 |

-continued

| | | | | | | | | | | | | | | | |
|---|---|---|---|---|---|---|---|---|---|---|---|---|---|---|---|
| 0FB0 | 21 | 20 | E9 | 06 | 05 | CD | 3B | D4 | CD | 11 | DF | 3E | 7E | CD | 26 | D4 |
| 0FC0 | 06 | 02 | CD | 33 | D4 | 3A | 9C | EA | B7 | 28 | 06 | 06 | CD | 33 | D4 |
| 0FD0 | C9 | 3A | 4B | E9 | FE | 20 | 20 | 0B | CD | 11 | DF | 3E | 24 | CD | 26 | D4 |
| 0FE0 | C3 | EE | DF | 3E | 24 | CD | 26 | D4 | 3A | 4B | E9 | CD | 26 | D4 | 21 | 4C |
| 0FF0 | E9 | 06 | 04 | CD | 3B | D4 | 3E | 2F | CD | 26 | D4 | 3E | 7E | CD | 26 | D4 |
| 1000 | 06 | 04 | CD | 33 | D4 | C9 | 06 | 16 | CD | 33 | D4 | C9 | 06 | 02 | CD | 33 |
| 1010 | D4 | 21 | 4E | E9 | 06 | 02 | CD | 3B | D4 | 06 | 01 | CD | 33 | D4 | 3E | 7C |
| 1020 | CD | 26 | D4 | 06 | 10 | CD | 33 | D4 | C9 | 3E | 22 | CD | 26 | D4 | 3A | 9C |
| 1030 | EA | B7 | 28 | 44 | 21 | 97 | EA | 11 | 55 | EA | CD | B3 | D2 | 3E | 24 | CD |
| 1040 | 26 | D4 | CD | 11 | DF | 3E | 30 | 06 | 04 | CD | 26 | D4 | 10 | FB | CD | 55 |
| 1050 | EA | CD | 26 | D4 | 3A | 56 | EA | CD | 26 | D4 | 3E | 2E | CD | 26 | D4 | 21 |
| 1060 | 96 | EA | 11 | 55 | EA | CD | B3 | D2 | 00 | 00 | 00 | 3A | 55 | EA | CD | 26 |
| 1070 | D4 | 3A | 56 | EA | CD | 26 | D4 | C9 | 21 | 51 | EA | 11 | 96 | EA | CD | 9E |
| 1080 | D2 | 3A | 59 | E9 | FE | 20 | 20 | 0D | 06 | 02 | CD | 33 | D4 | 3E | 24 | CD |
| 1090 | 26 | D4 | C3 | A3 | E0 | 3E | 24 | CD | 26 | D4 | CD | 11 | DF | 3A | 59 | E9 |
| 10A0 | CD | 26 | D4 | CD | 11 | DF | 3A | 5A | E9 | CD | 26 | D4 | 3E | 2E | CD | 26 |
| 10B0 | D4 | CD | 11 | DF | 3A | 5C | E9 | CD | 26 | D4 | CD | 11 | DF | 3A | 5D | E9 |
| 10C0 | CD | 26 | D4 | C9 | 21 | EA | A9 | CD | 3B | D4 | C9 | 21 | A5 | E9 |
| 10D0 | CD | DE | D4 | 06 | 03 | CD | 3B | D4 | 21 | A7 | E9 | 06 | 06 | CD | 3B | D4 |
| 10E0 | C9 | 3E | 0D | CD | 26 | D4 | 21 | 60 | E8 | 06 | 20 | CD | 3B | D4 | 3E | 0D |
| 10F0 | CD | 26 | D4 | 21 | 40 | E8 | 06 | 20 | CD | 3B | D4 | C9 | 3E | 02 | 32 | 8D |
| 1100 | EA | CD | 4B | D4 | 3E | 00 | 32 | 8E | EA | CD | D4 | 21 | 06 | E8 | 06 |
| 1110 | 04 | CD | 43 | D4 | 21 | 06 | E8 | 11 | 8F | EA | 01 | 04 | 00 | ED | B0 | C9 |
| 1120 | DB | 7E | CB | 7F | 20 | 5F | 21 | A2 | E1 | 11 | B2 | E9 | 01 | 0A | 00 | ED |
| 1130 | B0 | 11 | 3E | EA | 21 | 3A | EA | DD | 21 | 55 | EA | 06 | 03 | CD | DF | D2 |
| 1140 | 3A | 57 | EA | B7 | 20 | 1F | 3A | 56 | EA | B7 | 20 | 2E | 3A | 55 | EA | FE |
| 1150 | 40 | 30 | 27 | 21 | 3E | EA | 11 | 3A | EA | 01 | 03 | 00 | ED | B0 | 3A | 21 |
| 1160 | EA | F6 | 10 | 18 | 1A | 11 | 3A | EA | 21 | 3E | EA | DD | 21 | 55 | EA | 06 |
| 1170 | 03 | CD | DF | D2 | 3A | 57 | EA | B7 | 28 | CC | 3A | 21 | EA | E6 | EF | 32 |
| 1180 | 21 | EA | D3 | 7E | C9 | 3A | 28 | EA | 17 | 17 | 17 | E6 | 10 | 47 | 3A | 21 |
| 1190 | EA | E6 | EF | CD | 7F | E1 | 21 | B2 | E9 | 3E | 20 | 06 | 0A | CD | 68 |
| 11A0 | D2 | C9 | 5A | 45 | 52 | 4F | 20 | 54 | 52 | 41 | 43 | 4B | CD | 01 | E2 | 3A |
| 11B0 | 33 | EA | FE | 09 | C8 | FE | 0A | C8 | 3A | 58 | EA | 3C | E6 | 07 | 32 | 58 |
| 11C0 | EA | 21 | 67 | EA | 7E | B7 | 28 | 05 | 36 | 00 | 3D | 18 | 03 | 3A | 58 | EA |
| 11D0 | 47 | 0F | 0F | E6 | C0 | 6F | 78 | 0F | 0F | E6 | 01 | C6 | E8 | 67 | 78 | CB |
| 11E0 | 3F | C6 | F8 | 57 | 78 | 0F | E6 | 80 | 5F | 01 | 20 | 00 | ED | B0 | 3E | 20 |
| 11F0 | 12 | 7B | C6 | 20 | 5F | 01 | 20 | 00 | ED | B0 | 3E | 20 | 12 | CD | 1F | D5 |
| 1200 | C9 | CD | 1F | D5 | DB | 7F | E6 | 01 | 28 | F7 | CD | 1F | D5 | DB | 7F | E6 |
| 1210 | 01 | 20 | F7 | 21 | 00 | F8 | 0E | 10 | E5 | C5 | CD | 01 | E2 | C1 | E1 |
| 1220 | 3E | 20 | 06 | 40 | 77 | 23 | 10 | FC | 0D | 20 | EE | C9 | 21 | 59 | E9 | CD |
| 1230 | BA | D4 | 4F | 23 | CD | BA | D4 | CD | 1E | D4 | 23 | 23 | CD | BF | D4 | CD |
| 1240 | 1E | D4 | 23 | CD | C4 | D4 | CD | 1E | D4 | 32 | 2D | EA | CD | 4B | D4 | C9 |
| 1250 | 0E | 00 | 21 | 8D | EA | CD | D3 | D4 | 3A | 2D | EA | CD | 1E | D4 | 3A | 5A |
| 1260 | E9 | CD | 1E | D4 | 3A | 5D | E9 | CD | 1E | D4 | 11 | 7F | D4 | CD | CC | D4 |
| 1270 | 4F | 21 | 8E | EA | CD | D3 | D4 | 3A | 59 | E9 | CD | 1E | D4 | 3A | 5C | E9 |
| 1280 | CD | 1E | D4 | 3E | 10 | 91 | 27 | CD | 4B | D4 | C9 | CD | 47 | D3 | 22 | 74 |
| 1290 | EA | 3A | 75 | EA | FE | 04 | 38 | 0B | 21 | 30 | 30 | 22 | 06 | E8 | 22 | 08 |
| 12A0 | E8 | 18 | E8 | CD | 7E | D3 | 7C | B7 | 20 | 06 | 2A | 74 | EA | CD | 05 | EA |
| 12B0 | CD | 4B | E3 | 3A | 74 | EA | B7 | 20 | 05 | 3A | 75 | EA | B7 | C8 | 11 | 40 |
| 12C0 | E8 | CD | 39 | E3 | CD | 90 | D3 | 28 | 0C | 4F | 7B | FE | 60 | CA | 01 | E3 |
| 12D0 | 79 | 12 | 13 | 18 | EF | 11 | 60 | E8 | CD | 39 | E3 | CD | 90 | D3 | 28 | 0C |
| 12E0 | 4F | 7B | FE | 80 | CA | 01 | E3 | 79 | 12 | 13 | 18 | EF | 3A | 41 | EA | B7 |
| 12F0 | 20 | 09 | 3A | 3D | EA | B7 | 20 | 03 | CD | 76 | E5 | 3E | 01 | 32 | 67 | EA |
| 1300 | C9 | CD | 4B | E3 | C9 | 22 | 74 | EA | 21 | 00 | 08 | CD | 97 | D3 | 47 | 3A |
| 1310 | 74 | EA | B8 | 20 | 1E | 23 | CD | 97 | D3 | 47 | 2B | 3A | 75 | EA | B8 | 20 |
| 1320 | 12 | 23 | 23 | CD | 97 | D3 | F5 | 23 | CD | 97 | D3 | 57 | F1 | 5F | 2B | 2B |
| 1330 | 2B | EB | C9 | 23 | 23 | 23 | 18 | D2 | CD | 97 | D3 | FE | 5B | D8 | D6 |
| 1340 | 58 | E6 | 0F | 47 | 3E | 20 | CD | 56 | E3 | 23 | C9 | 11 | 20 | E8 | 3E | 20 |
| 1350 | 06 | 60 | CD | 56 | E3 | C9 | 12 | 13 | 10 | FC | C9 | CD | 47 | D3 | 7D | E6 |
| 1360 | F0 | 6F | 22 | 72 | EA | CD | 86 | E3 | C9 | 2A | 72 | EA | 7C | FE | 00 | 20 |
| 1370 | 05 | 7D | FE | 10 | 28 | 0B | 11 | E0 | FF | 19 | 22 | 72 | EA | CD | 86 | E3 |
| 1380 | C9 | 21 | F0 | 03 | 18 | F4 | 3A | 73 | EA | FE | 04 | 20 | 05 | 3E | 00 | 32 |
| 1390 | 73 | EA | 21 | 72 | EA | 11 | 6A | EA | CD | ED | D2 | 21 | 00 | F8 | 22 | 6E |
| 13A0 | EA | 21 | C6 | E4 | 22 | 94 | EA | 21 | 6A | EA | 11 | 00 | EB | 01 | 04 | 00 |
| 13B0 | ED | B0 | 3E | 20 | 12 | 13 | 62 | 6B | 22 | 70 | EA | CD | FF | E3 | CD | 63 |
| 13C0 | E4 | CD | 01 | E2 | ED | 5B | 6E | EA | 21 | 00 | EB | 01 | 40 | 00 | ED | B0 |
| 13D0 | 2A | 72 | EA | 23 | 22 | 72 | EA | 06 | 04 | 21 | 6D | EA | 7E | 3C | 27 | FE |
| 13E0 | 3F | 38 | 06 | D6 | 10 | 77 | 2B | 10 | F3 | 77 | 2A | 6E | EA | 11 | 40 | 00 |
| 13F0 | 19 | 22 | 6E | EA | 7C | FE | FC | 20 | AE | 2A | 89 | EA | 36 | BE | C9 | 3E |
| 1400 | 00 | 32 | 69 | EA | 2A | 72 | EA | BC | 20 | 03 | BD | 28 | 4F | CD | 7E | D3 |
| 1410 | 7C | B7 | 20 | 06 | 2A | 72 | EA | CD | 05 | E3 | CD | 90 | D3 | FE | 5B | 38 |
| 1420 | 02 | 3E | 20 | FE | 0D | 28 | 15 | D9 | 2A | 70 | EA | 77 | D9 | 2A | 89 | 70 |
| 1430 | EA | 23 | 22 | 70 | EA | 7D | D9 | FE | 40 | 20 | DF | C9 | 3E | 20 | D9 | 2A |
| 1440 | 70 | EA | 77 | D9 | 3A | 69 | EA | 3C | 32 | 69 | EA | FE | 02 | 20 | DE | 2A |
| 1450 | 70 | EA | 3E | 20 | 23 | 77 | 7D | FE | 3F | 38 | F7 | C9 | 2A | 70 | EA | 36 |
| 1460 | 20 | 18 | EF | 2A | 94 | EA | 11 | 6A | EA | 11 | 96 | 38 | 2D | 20 | 19 | 23 |
| 1470 | 13 | 1A | 96 | 38 | 24 | 20 | 10 | 23 | 13 | 1A | 96 | 38 | 1B | 20 | 07 | 23 |
| 1480 | 13 | 1A | 96 | 38 | 12 | 2B | 2B | 2B | 3E | FF | 32 | 93 | EA | 11 | 04 | 00 |
| 1490 | 19 | 22 | 94 | EA | C3 | 63 | E4 | 2B | 2B | 2B | 3A | 93 | EA | B7 | C8 | 2A |
| 14A0 | 94 | EA | 2B | 2B | 2B | 2B | 11 | C6 | E4 | 37 | 3F | ED | 52 | EB | 21 | 00 |
| 14B0 | 00 | 19 | 19 | 19 | 11 | F2 | E4 | 19 | 11 | 34 | EB | 01 | 0C | 00 | ED | B0 |
| 14C0 | 3E | 00 | 32 | 93 | EA | C9 | 30 | 30 | 30 | 31 | 30 | 30 | 37 | 36 | 30 | 31 |

-continued

| | | | | | | | | | | | | | | | |
|---|---|---|---|---|---|---|---|---|---|---|---|---|---|---|---|
| 14D0 | 33 | 36 | 30 | 31 | 35 | 31 | 30 | 31 | 36 | 36 | 30 | 32 | 31 | 38 | 30 | 32 |
| 14E0 | 38 | 35 | 30 | 33 | 31 | 31 | 31 | 35 | 30 | 30 | 31 | 34 | 37 | 30 | 30 | 33 |
| 14F0 | 31 | 31 | 20 | 20 | 20 | 20 | 20 | 20 | 20 | 20 | 42 | 45 | 45 | 46 | 20 | 20 |
| 1500 | 50 | 4F | 52 | 4B | 20 | 26 | 20 | 48 | 41 | 4D | 20 | 20 | 20 | 20 | 20 | 20 |
| 1510 | 20 | 20 | 56 | 45 | 41 | 4C | 20 | 20 | 20 | 20 | 20 | 20 | 20 | 20 | 4C | 41 |
| 1520 | 4D | 42 | 20 | 20 | 20 | 20 | 20 | 50 | 4F | 55 | 4C | 54 | 52 | 59 | 20 | 20 |
| 1530 | 20 | 20 | 20 | 20 | 20 | 20 | 46 | 49 | 53 | 48 | 20 | 20 | 4C | 55 | 4E | 43 |
| 1540 | 48 | 20 | 4D | 45 | 41 | 54 | 20 | 20 | 20 | 20 | 20 | 20 | 46 | 52 | 55 | 49 |
| 1550 | 54 | 53 | 20 | 20 | 4C | 55 | 4E | 43 | 48 | 20 | 4D | 45 | 41 | 54 | 20 | 20 |
| 1560 | 56 | 45 | 47 | 45 | 54 | 41 | 42 | 4C | 45 | 53 | 20 | 20 | 20 | 20 | 20 | 20 |
| 1570 | 46 | 52 | 55 | 49 | 54 | 53 | CD | 47 | D3 | 7C | FE | 02 | D2 | E5 | E5 | 2B |
| 1580 | EB | 21 | 00 | 00 | 19 | 19 | 19 | 19 | 11 | 00 | C8 | 19 | 5E | 23 | 56 | 7B |
| 1590 | A7 | EA | 9A | E5 | CB | 72 | 20 | 4D | 18 | 04 | CB | 72 | 28 | 47 | 7A | A7 |
| 15A0 | E2 | E5 | E5 | 2B | 11 | 4B | E9 | E5 | CD | ED | D2 | 11 | 4E | E9 | 1A | 13 |
| 15B0 | 12 | 1B | 1B | 1A | 13 | 12 | 1B | 3E | 2E | 12 | 1B | 1B | 1A | FE | 30 | 20 |
| 15C0 | 03 | 3E | 20 | 12 | CD | FD | D6 | 3E | 20 | 32 | E9 | E8 | E1 | 23 | 23 | E5 |
| 15D0 | 11 | E7 | E8 | CD | B3 | D2 | CD | 58 | DB | E1 | 23 | 11 | A6 | E8 | CD | B3 |
| 15E0 | D2 | CD | 7B | DB | C9 | 21 | 20 | 20 | 22 | 4B | E9 | 22 | 4E | E9 | 22 | E7 |
| 15F0 | E8 | CD | 58 | DB | C9 | CD | 47 | D3 | 7D | B7 | 20 | 03 | 7C | B7 | C8 | 7C |
| 1600 | FE | 02 | D0 | 7D | FE | AB | D0 | 2B | EB | 21 | 00 | 00 | 19 | 19 | 19 | 19 |
| 1610 | 11 | 00 | C8 | 19 | 22 | 74 | EA | 21 | 00 | 00 | 3A | 4B | E9 | E6 | 0F | 47 |
| 1620 | 28 | 06 | 11 | E8 | 03 | 19 | 10 | FD | 3A | 4C | E9 | E6 | 0F | FF | 47 | 28 | 06 |
| 1630 | 11 | 64 | 00 | 19 | 10 | FD | 3A | 4E | E9 | E6 | 0F | 28 | 07 | 47 | 11 | 0A |
| 1640 | 00 | 19 | 10 | FD | 3A | 4F | E9 | E6 | 0F | 85 | 6F | 30 | 01 | 24 | 7D | A7 |
| 1650 | E2 | 55 | E6 | CB | F4 | 7C | A7 | EA | 5C | E6 | CB | FC | ED | 5B | 74 | EA |
| 1660 | 7D | 12 | 13 | 7C | 12 | 21 | E7 | E8 | 13 | CD | CD | D2 | 21 | A6 | E8 | 13 |
| 1670 | CD | CD | D2 | C9 | CD | 47 | D3 | 7D | B7 | 20 | 03 | 7C | B7 | C8 | 22 | 72 |
| 1680 | EA | CD | 7E | D3 | 7C | B7 | 20 | 0F | 2A | 72 | EA | CD | 05 | E3 | ED | 53 |
| 1690 | 7A | EA | 22 | 7C | EA | 18 | 0B | 22 | 7C | EA | 2A | 72 | EA | 2B | 29 | 22 |
| 16A0 | 7A | EA | 21 | FC | 07 | 23 | 23 | 23 | 23 | 97 | D3 | FE | FF | 20 | F5 |
| 16B0 | 22 | 7E | EA | 23 | 23 | CD | 90 | D3 | 32 | 80 | EA | CD | 97 | D3 | 32 | 81 |
| 16C0 | EA | 2A | 7C | EA | 3E | 00 | 32 | 69 | EA | D9 | 21 | 40 | EB | D9 | CD | 90 |
| 16D0 | D3 | D9 | 77 | 23 | D9 | 20 | F7 | 3A | 69 | EA | 3C | 32 | 69 | EA | FE | 02 |
| 16E0 | 20 | EC | CD | 52 | E7 | 21 | 40 | EB | 11 | 90 | EB | 06 | 02 | 1A | BE | 23 |
| 16F0 | 13 | 20 | 09 | FE | 0D | 20 | F6 | 10 | F4 | C9 | 1A | 13 | FE | 0D | 20 | FA |
| 1700 | 10 | F8 | D9 | 21 | 90 | EB | D9 | 7B | D6 | 90 | 47 | 2A | 80 | EA | 4F | CD |
| 1710 | 90 | D3 | FE | FF | C0 | 10 | F8 | 41 | 2A | 80 | EA | CD | BE | D3 | 22 | 80 |
| 1720 | EA | D9 | 21 | 80 | EA | D9 | 2A | 7E | EA | 11 | 06 | 00 | 19 | 06 | 02 | CD |
| 1730 | BE | D3 | D9 | 21 | 72 | EA | D9 | 2A | 7E | EA | 06 | 02 | CD | BE | D3 | D9 |
| 1740 | 21 | 56 | EA | 36 | 00 | 2B | 36 | 00 | D9 | 2A | 7A | EA | 06 | 02 | CD | BE |
| 1750 | D3 | C9 | 3E | 00 | 32 | 87 | EA | 21 | 90 | EB | 22 | 82 | EA | 21 | 40 | E8 |
| 1760 | 22 | 84 | EA | 3E | 00 | 32 | 86 | EA | 2A | 84 | EA | 7E | FE | 20 | 20 | 33 |
| 1770 | 3A | 86 | EA | 3C | 32 | 86 | EA | 23 | 22 | 84 | EA | 7D | E6 | 3F | FE | 20 |
| 1780 | 20 | E6 | 3E | 0D | 2A | 82 | EA | 77 | 23 | 22 | 82 | EA | 3A | 87 | EA | 3C |
| 1790 | 32 | 87 | EA | FE | 02 | 28 | 4F | 3A | 84 | EA | E6 | E0 | C6 | 20 | 32 | 84 |
| 17A0 | EA | 18 | C0 | 3A | 86 | EA | FE | 02 | 30 | 08 | FE | 01 | 20 | 11 | 3E | 20 |
| 17B0 | 18 | 05 | 3A | 86 | EA | C6 | 58 | 2A | 82 | EA | 77 | 23 | 22 | 82 | EA | 2A |
| 17C0 | 84 | EA | 7D | E6 | 20 | F6 | 5F | 6F | 3E | 20 | BE | 2B | 28 | FC | 23 | ED |
| 17D0 | 5B | 84 | EA | 7D | 93 | 3C | 4F | 06 | 00 | EB | ED | 5B | 82 | EA | ED | B0 |
| 17E0 | ED | 53 | 82 | EA | 18 | 9C | C9 | C8 | FF | FF | FF | FF | FF | FF | FF | FF |
| 17F0 | FF | FF | FF | FF | FF | FF | FF | FF | FF | FF | FF | FF | FF | FF | FF | FF |

What is claimed is:

1. In a weighing and label printing system having a scale, a label printer, and a controller for responding to the weight of a commodity on the scale, for computing the price of the commodity, and for causing the label printer to print the commodity's price, weight and other commodity characteristics, an improved controller comprising:

memory means for storing at least a list of commodities to be priced, an alpha description of each commodity, and a price per pound of each commodity;
  a keyboard having a plurality of keys thereon;
  a cathode ray tube; and
  circuit means coupled to the scale, the label printer, the memory, the cathode ray tube and the keyboard, the circuit means being responsive to operator actuation of a selected keyboard key for causing the cathode ray tube to display the list of commodities from memory, responsive to operator actuation of a keyboard key for causing the cathode ray tube to extinguish the displayed commodity list and to display the alpha description and the price per pound of a commodity selected from the list, for computing and displaying the computed price of the commodity, and for activating the label printer to print a label bearing at least the displayed alpha description, price per pound, and computed price.

2. A controller as set forth in claim 1 wherein the controller assumes an automatic mode in response to actuation of said selected keyboard key for displaying the commodity list, wherein said circuit means causes a cursor to be displayed with the commodity list, wherein the keyboard includes at least one cursor positioning key for positioning the cursor adjacent a selected commodity on the displayed list, and wherein said circuit means causes the cathode ray tube to display the alpha description and the price per pound of the commodity adjacent the cursor in response to actuation of a keyboard key.

3. A controller as set forth in claim 2 wherein said circuit means responds to the cursor being at an end of the displayed commodity list and the cursor positioning key being actuated for causing the cathode ray tube to display an additional list of commodities.

4. A controller as set forth in claim 3 wherein cursor positioning is effected by a cursor up key and a cursor down key, wherein the circuit means positions the cursor at the top of the commodity list in response to continued actuation of the cursor up key and positions the cursor at the bottom of the commodity list in response to continued actuation of the cursor down key, and wherein the circuit means causes the cursor to appear at the top of an additional list of commodities when said additional list is displayed in response to the cursor reaching the top of a previously displayed commodity list so that continued actuation of the cursor up key causes additional commodity list to be displayed without moving the cursor through each commodity list.

5. A controller as set forth in claim 2 wherein the keyboard includes a manual entry key and a plurality of index number entry keys, wherein said circuit means is responsive to actuation of the manual entry key for operating in a manual mode and, when in the manual mode, responsive to actuation of the number entry keys for causing the cathode ray tube to display at least the alpha description and the price per pound of a commodity corresponding to the number entered.

6. A controller as set forth in claim 1 wherein said memory means also stores a grade list for identifying various commodity grades, wherein the keyboard includes a grade index key, and wherein said circuit means responds to said grade index key for causing the cathode ray tube to display the grade list.

7. A controller as set forth in claim 6 wherein a cursor is displayed with the grade list, wherein the keyboard includes at least one cursor positioning key, wherein said circuit means responds to actuation of the cursor positioning key for moving the cursor adjacent a selected grade and responds to another actuation of the grade index key for displaying the selected grade as part of the alpha description of a selected commodity.

8. A controller as set forth in claim 7 including a key operated switch for causing the selected grade to be stored in memory in association with an alpha description of a selected commodity.

9. A controller as set forth in claim 6 wherein the keyboard includes a manual grade entry key and a plurality of numbered keys for entering a number indicative of a selected grade included on the grade list, and wherein said circuit means is responsive to actuation of the grade entry key followed by actuation of said numbered keys for causing the grade identified by the entered number to be displayed on the cathode ray tube in association with the alpha description of a selected commodity.

10. A controller as set forth in claim 1 wherein the keyboard includes a price key and a plurality of numbered keys, and wherein said circuit means is responsive to actuation of the price key followed by actuation of selected numbered keys for changing the displayed price per pound without changing the corresponding price per pound stored in the memory means.

11. A controller as set forth in claim 10 further including a key operated switch for storing the changed price per pound in said memory means.

12. A controller as set forth in claim 11 wherein said memory means includes an erasable memory, wherein said circuit means includes:
a microprocessor;
first transistor means responsive to the key operated switch for initiating a current path, for sending an encode signal to the microprocessor so that the microprocessor outputs a memory write control signal, and for outputting a programming signal for altering the data in the erasable memory;
a relay having one end thereof coupled to the current path;
second transistor means coupled between the microprocessor and the other end of the relay and responsive to the memory write control signal for coupling current from the current path through the relay to actuate the relay; and
means responsive to actuation of the relay for holding the current path on during alteration of data, whereby the erasable memory is inhibited from receiving the programming signal except when the microprocessor outputs a memory write control signal in response to the key operated switch.

13. A controller as set forth in claim 1 wherein the cathode ray tube displays a cursor along with the alpha description, wherein the keyboard includes at least one horizontal positioning cursor key and at least one vertical positioning cursor key, wherein said circuit means responds to actuation of said cursor keys for positioning the cursor at a portion of the alpha description to be changed and then responds to actuation of the vertical positioning cursor key for displaying a sequence of alpha characters at the position of the cursor and for holding in display the alpha character displayed upon deactuation of the vertical positioning cursor key, thereby enabling an operator to change the alpha description.

14. In a weighing and label printing system having a scale, a label printer, and a controller for responding to the weight of a commodity on the scale, for computing the price of the commodity, and for causing the label printer to print the commodity's price, weight and other commodity characteristics, an improved controller comprising:
memory means for storing a list of commodities to be priced, an alpha description of each commodity, a price per pound of each commodity, and a grade list identifying various commodity grades;
a keyboard having a plurality of numbered keys for entering numbers, a commodity list key, a commodity index key, a grade index key, a cursor horizontal positioning key, a cursor vertical positioning key, and a price key,
a cathode ray tube; and
circuit means coupled to the scale, the label printer, the memory, the cathode ray tube and the keyboard, and responsive to operator actuation of the commodity index key for causing the cathode ray tube to display the list of commodities and a cursor, responsive to actuation of the cursor vertical positioning key for moving the cursor adjacent a selected displayed commodity, responsive to further actuation of the commodity index key for displaying a commodity list for the selected commodity and the alpha description and the price per pound of the commodities in the displayed list;
said circuit means being responsive to actuation of the grade index key for causing the cathode ray tube to display the grade list and a cursor, responsive to actuation of a cursor positioning key for moving the cursor to a selected grade, and responsive to further actuation of the grade index key for displaying the selected grade as a part of the alpha description of the selected commodity;
said circuit means being responsive to actuation of the price key followed by actuation of selected numbered keys for changing the displayed price per pound;

said circuit means being also responsive to a cursor positioning key while the alpha description is displayed for moving the cursor to a portion of the alpha description to be changed, and responsive to actuation of another cursor positioning key for sequentially displaying different alpha characters at the position of the cursor until the last mentioned cursor positioning control is deactuated so as to modify the alpha content of the description, said circuit means being adapted to activate the label printer to print a label bearing at least the displayed alpha description and price per pound.

* * * * *

UNITED STATES PATENT AND TRADEMARK OFFICE
CERTIFICATE OF CORRECTION

PATENT NO. : 4,398,253
DATED : August 9, 1983
INVENTOR(S) : Karp et al.

It is certified that error appears in the above-identified patent and that said Letters Patent are hereby corrected as shown below:

```
Column  3, line 42, delete "abutt", insert -- abut --.
Column  3, line 60, delete "siezed", insert -- seized --.
Column  8, line 37, delete "lined", insert -- lines --.
Column  8, line 41, delete "latach", insert -- latch --.
Column  8, line 45, delete "signal", insert -- signals --.
Column  8, line 55, delete "140", insert -- 141 --.
Column  9, line  2, delete "CE", insert -- CE --.
Column  9, line 16, delete "4 4", insert -- 4 --.
Column 11, line  4, delete "than", insert -- then --.
Column 12, line 21, delete ":First", insert -- :first --.
Column 12, line 36, delete "micromputers", insert
-- microcomputers --.
Column 16, line 49, after "zero span", delete "led",
insert -- LED --.
In claim 4, column 27, line 10, delete "list", insert
-- lists --.
In claim 14, column 28, line 61, delete "cursot", insert
-- cursor --.
```

Signed and Sealed this

Fifteenth Day of November 1983

[SEAL]

Attest:

GERALD J. MOSSINGHOFF

Attesting Officer

Commissioner of Patents and Trademarks